United States Patent [19]

Jenkins

[11] E Patent Number: Re. 32,490

[45] **Reissued Date of Patent: * Sep. 1, 1987**

[54] METHOD OF MAKING A COMPOSITE LABEL WEB

[75] Inventor: William A. Jenkins, Dayton, Ohio

[73] Assignee: Monarch Marking Systems, Inc., Dayton, Ohio

[ * ] Notice: The portion of the term of this patent subsequent to Dec. 3, 1991 has been disclaimed.

[21] Appl. No.: 88,802

[22] Filed: Oct. 29, 1979

Related U.S. Patent Documents

Reissue of:

[64] Patent No.: 4,081,309
Issued: Mar. 28, 1978
Appl. No.: 715,812
Filed: Aug. 19, 1976

U.S. Applications:

[60] Division of Ser. No. 607,317, Aug. 25, 1975, which is a continuation-in-part of Ser. No. 475,728, Jun. 3, 1974, Pat. No. 3,948,172, and Ser. No. 475,730, Jun. 3, 1974, Pat. No. 3,941,289, each is a division of Ser. No. 366,919, Jun. 4, 1973, abandoned, which is a division of Ser. No. 206,061, Dec. 8, 1971, Pat. No. 3,783,083, which is a continuation-in-part of Ser. No. 155,740, Jun. 23, 1971, abandoned.

[51] Int. Cl.[4] ..... B32B 3/16; B32B 31/18

[52] U.S. Cl. ..... 156/250; 40/2 R; 156/184; 156/253; 156/268; 156/270; 156/289; 156/344; 283/101; 283/103; 428/42

[58] Field of Search ..... 283/101, 103, 21; 156/184, 234, 238, 248, 250, 252, 253, 257, 268–270, 289, 302, 344, 510, 541, DIG. 33; 40/2 R; 428/40–42, 202; 206/390, 460, 813, 820; 226/6; 282/21 R, 11.5 A

[56] References Cited

U.S. PATENT DOCUMENTS

| | | | |
|---|---|---|---|
| 2,095,437 | 10/1937 | Fox | 206/813 X |
| 2,259,358 | 10/1941 | Templeton | 229/69 X |
| 2,620,205 | 12/1952 | Vogt | 281/5 |
| 2,636,297 | 4/1953 | Johnson | 156/253 |
| 2,665,509 | 1/1954 | Flood | 40/2 R |
| 3,501,365 | 3/1970 | Marshall | 156/283 |
| 3,669,814 | 6/1972 | Faltin | 428/43 |
| 3,800,701 | 4/1974 | Martin | 156/384 X |
| 3,852,140 | 12/1974 | Jenkins | 156/253 |

FOREIGN PATENT DOCUMENTS

| | | |
|---|---|---|
| 1940799 | 6/1966 | Fed. Rep. of Germany . |
| 1057126 | 2/1967 | United Kingdom . |

*Primary Examiner*—Michael G. Wityshyn
*Attorney, Agent, or Firm*—Joseph J. Grass

[57] ABSTRACT

There are disclosed various embodiments of a composite web of pressure sensitive labels, method and apparatus for making such embodiments of the composite web, and method and apparatus by which a composite web of labels is advanced and by which labels are successively printed and applied to merchandise.

24 Claims, 72 Drawing Figures

STOCK
12345

FIG-11
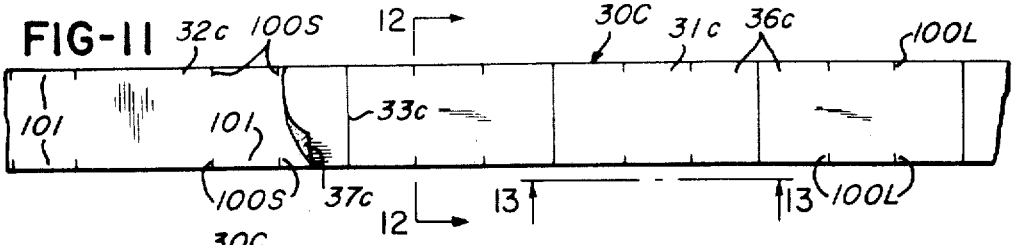
FIG-12
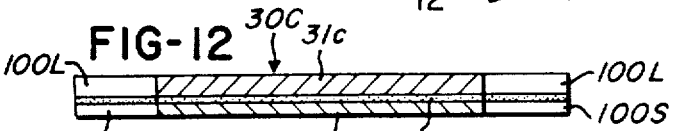
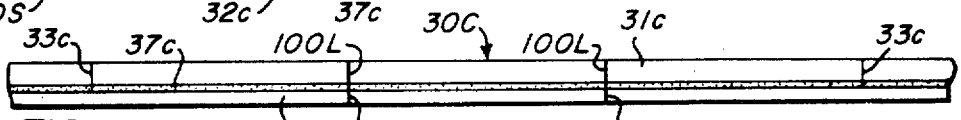
FIG-13
FIG-14
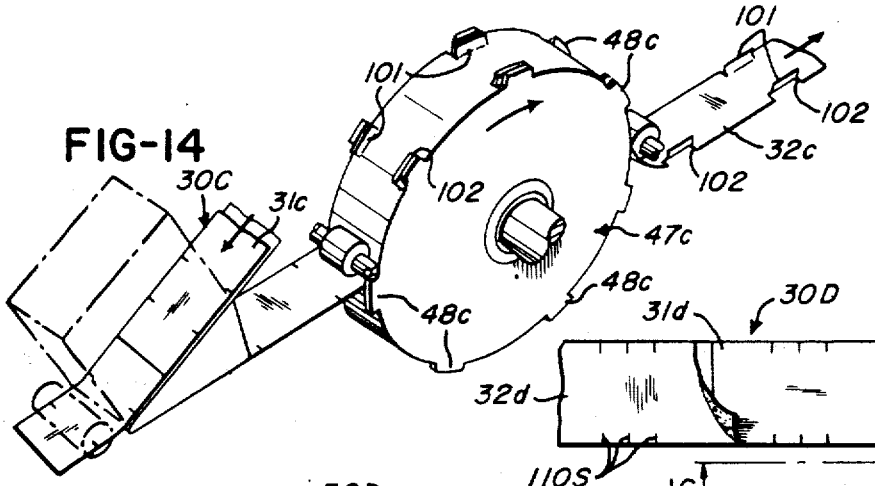
FIG-15
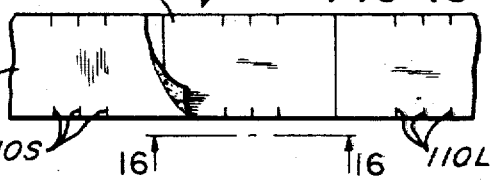
FIG-16
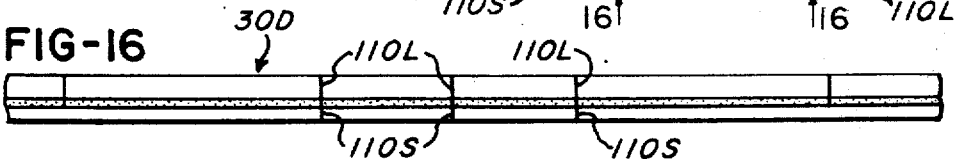
FIG-17
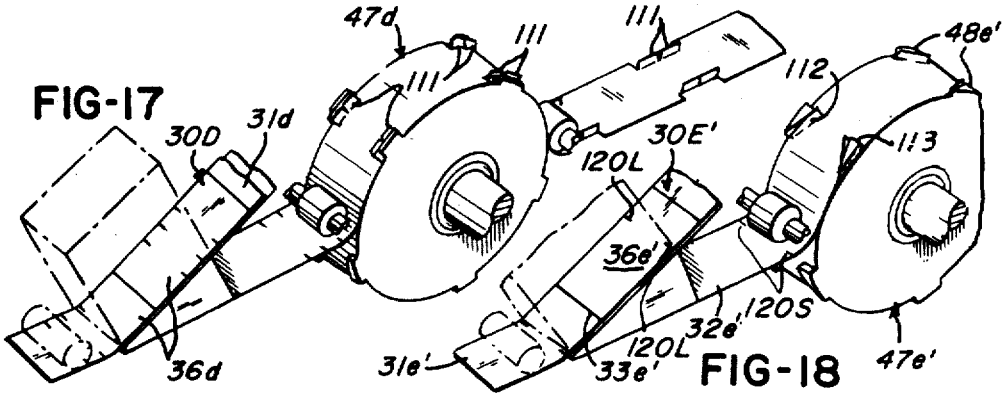
FIG-18

FIG-19
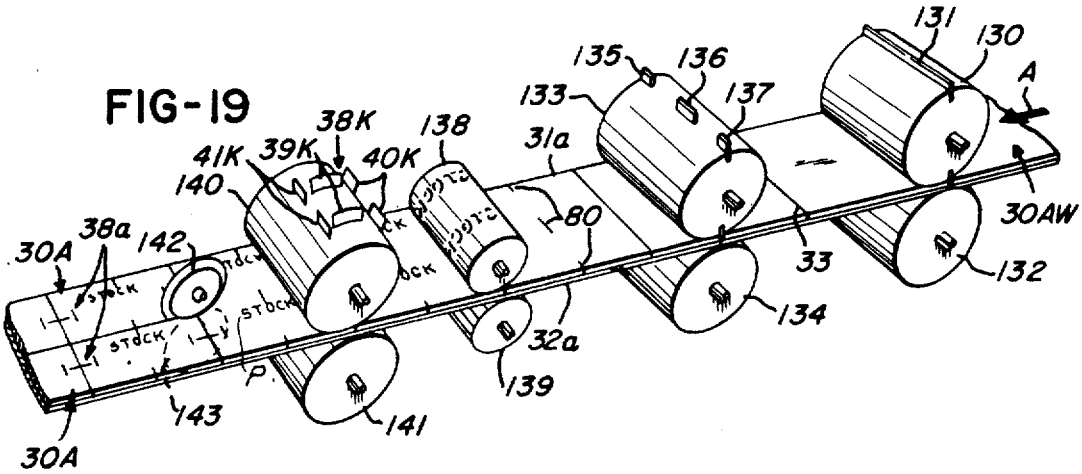
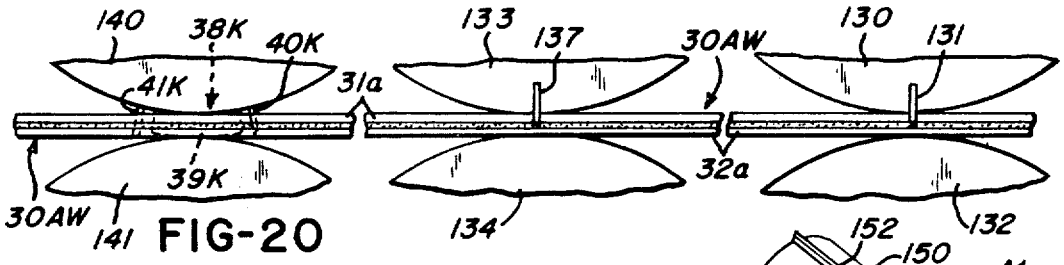
FIG-20
FIG-21
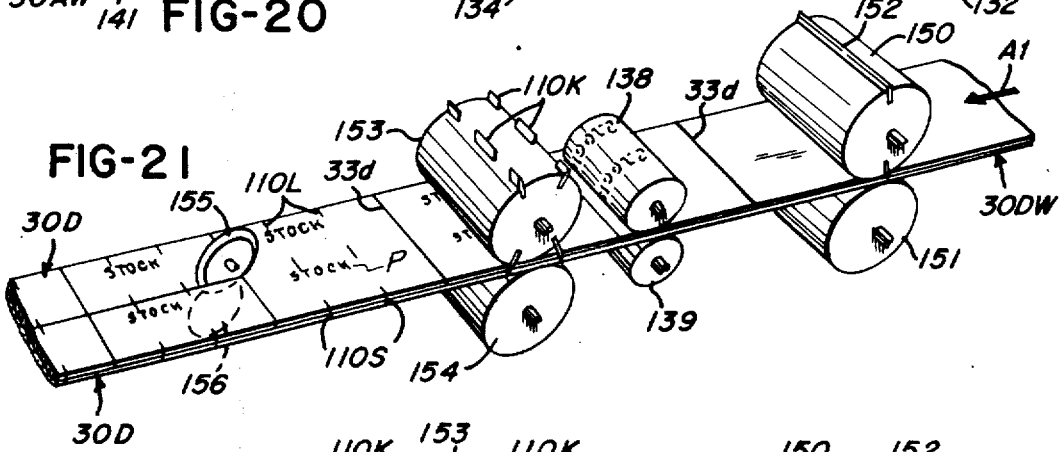
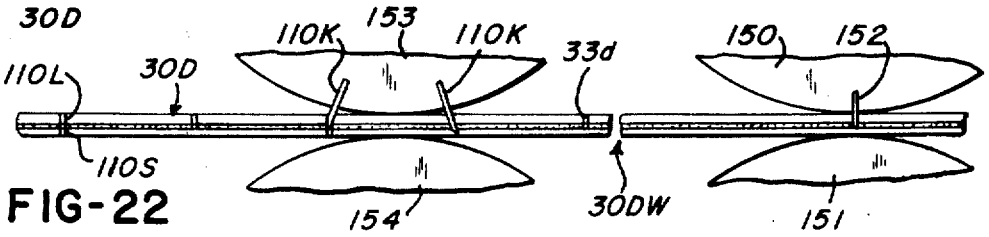
FIG-22

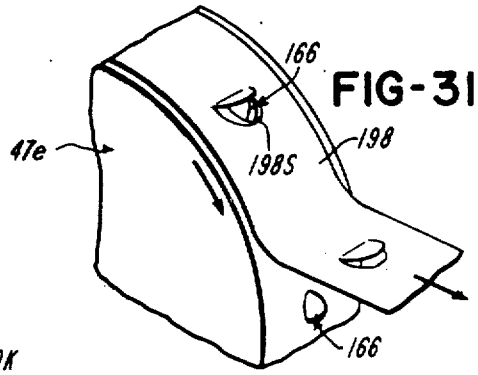
FIG-31
FIG-30
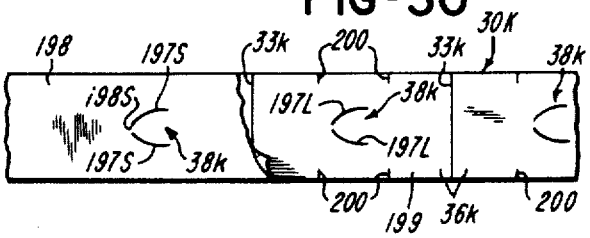
FIG-32
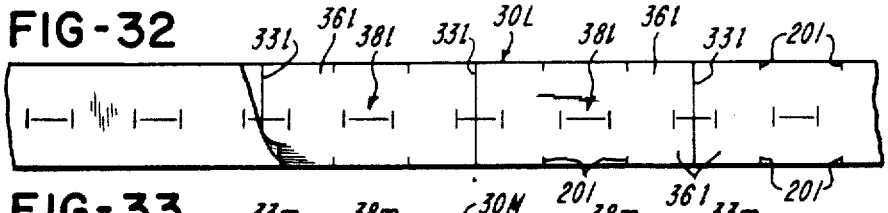
FIG-33
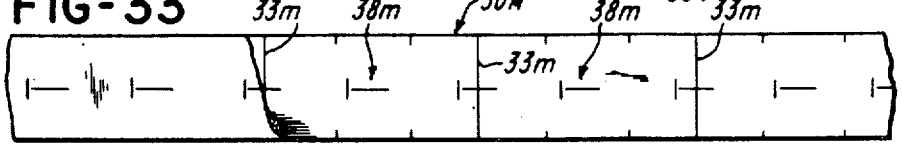
FIG-34
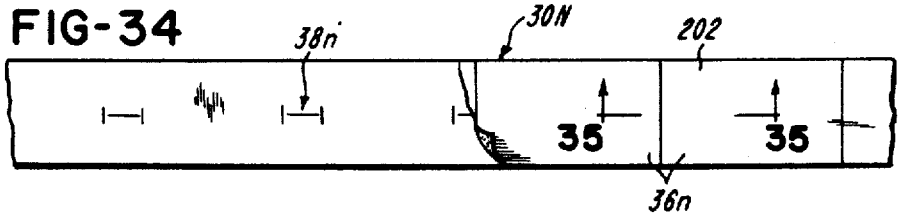
FIG-35
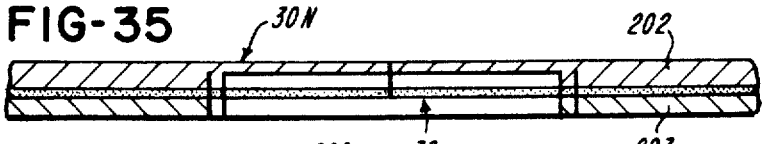
FIG-36
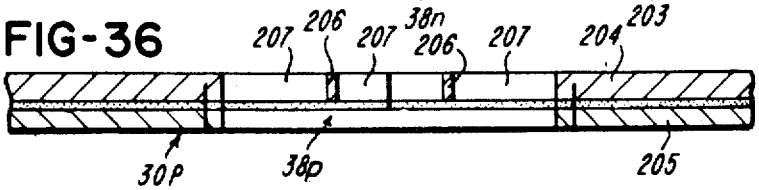

FIG-42
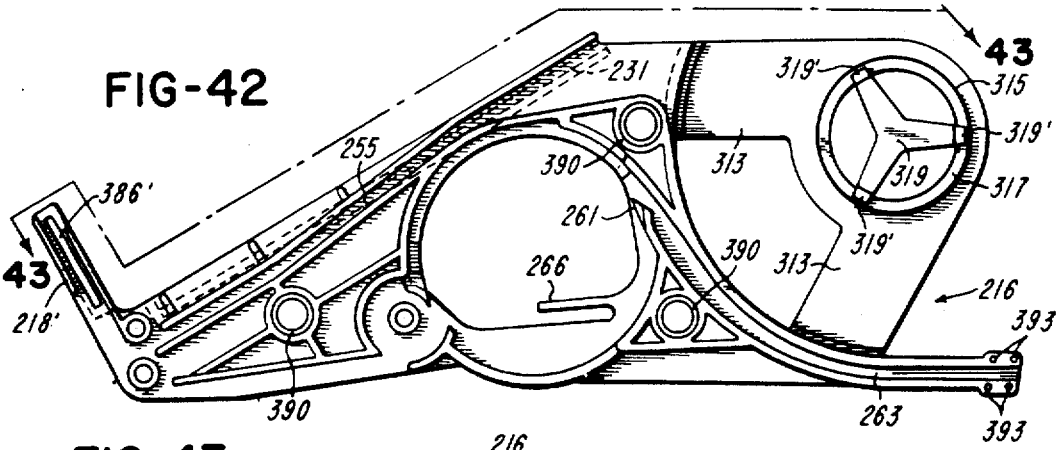
FIG-43
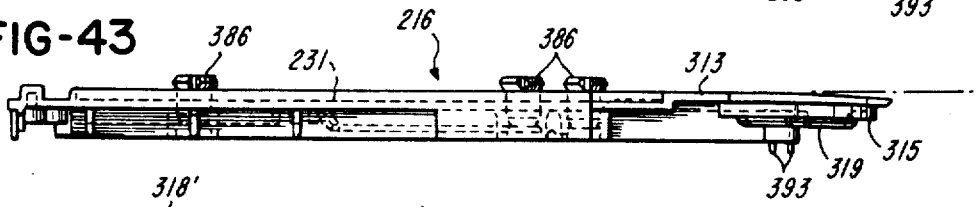
FIG-44
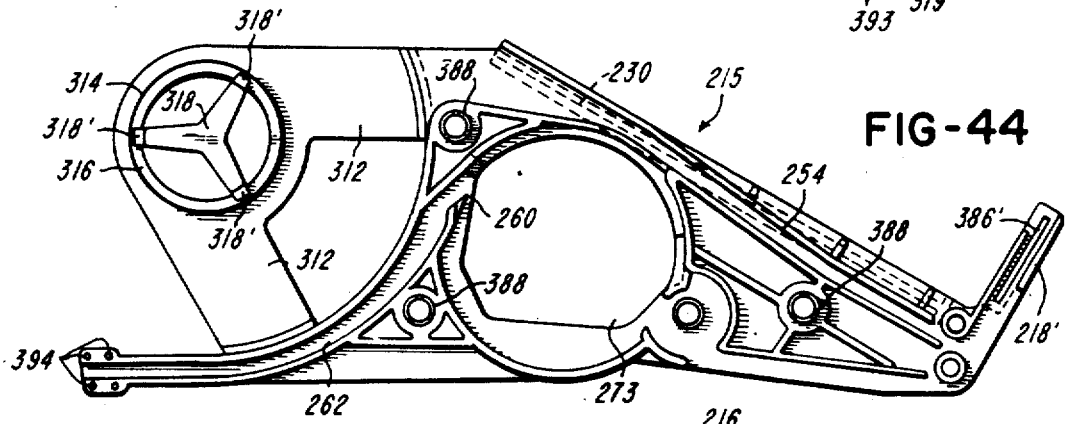
FIG-45
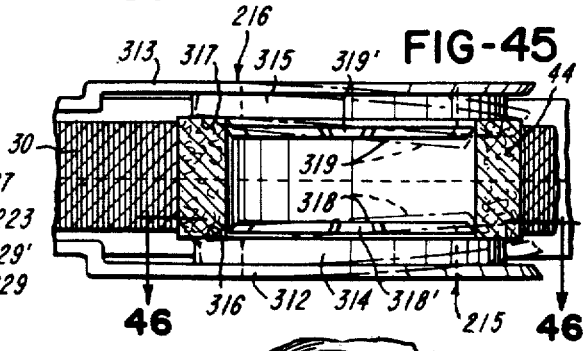
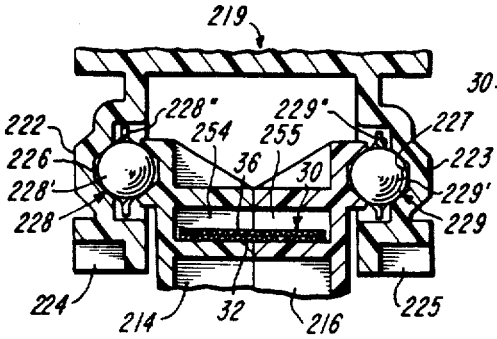
FIG-47
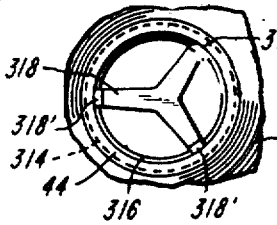
FIG-46

FIG-49
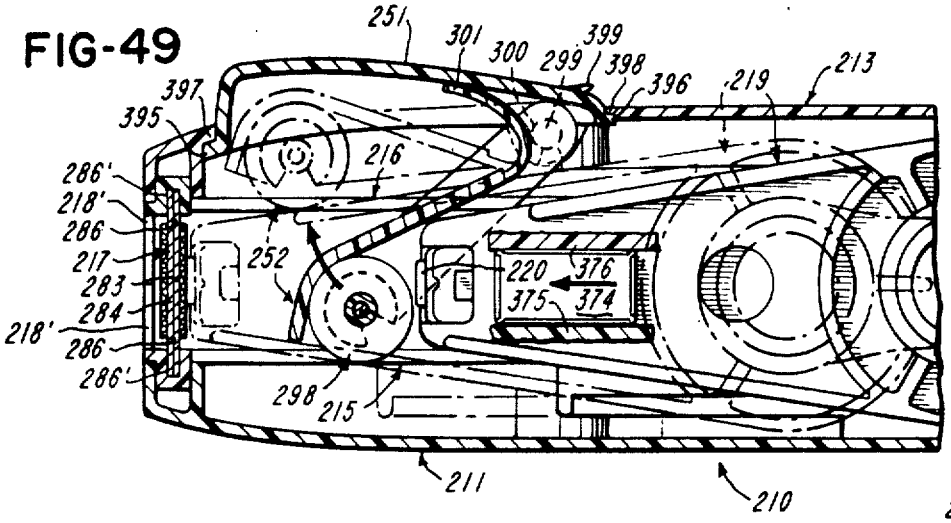
FIG-50
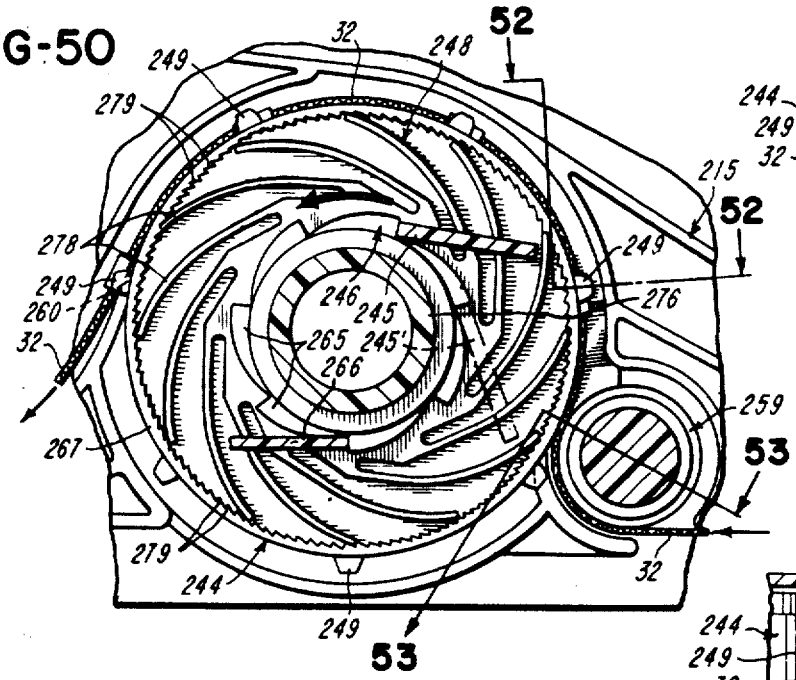
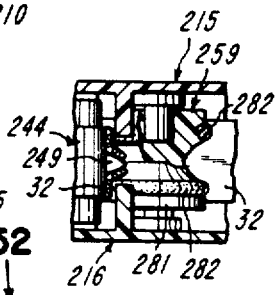
FIG-52
FIG-53
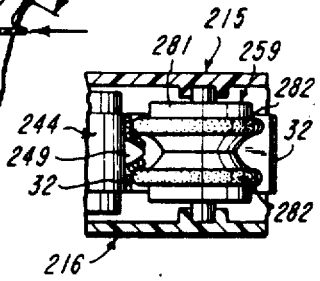
FIG-51
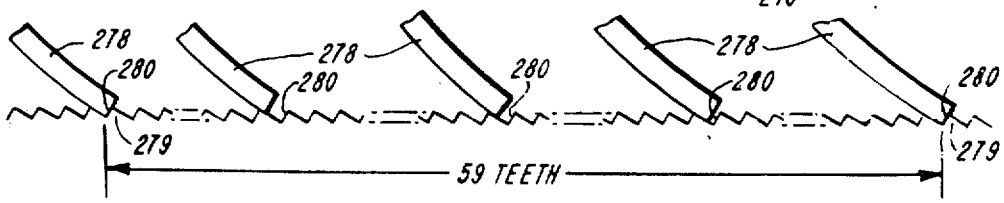

FIG-55
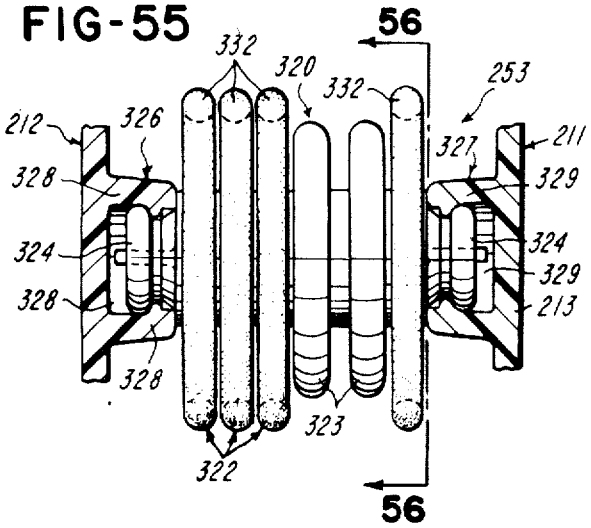
FIG-56
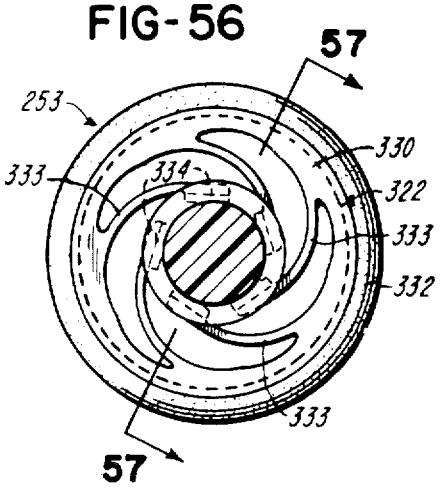
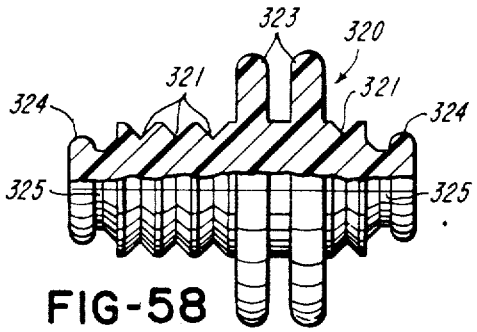
FIG-58
FIG-57
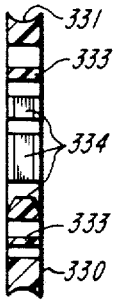
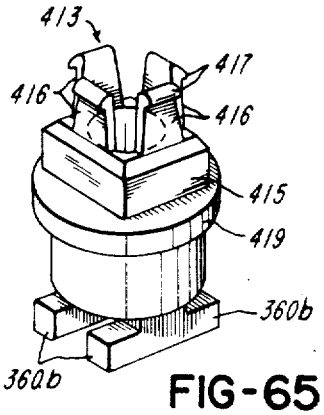
FIG-65
FIG-54
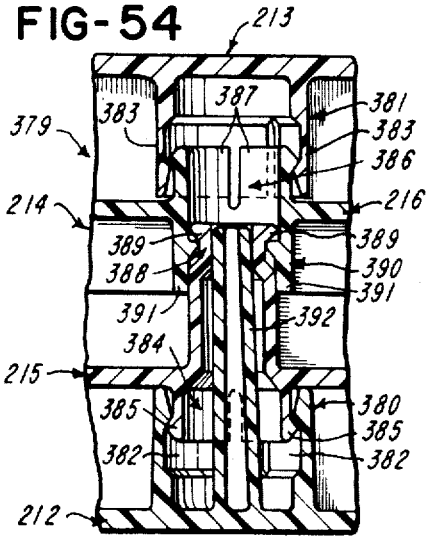
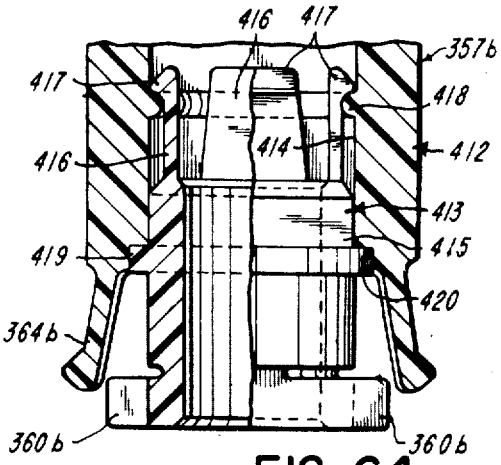
FIG-64

FIG-59
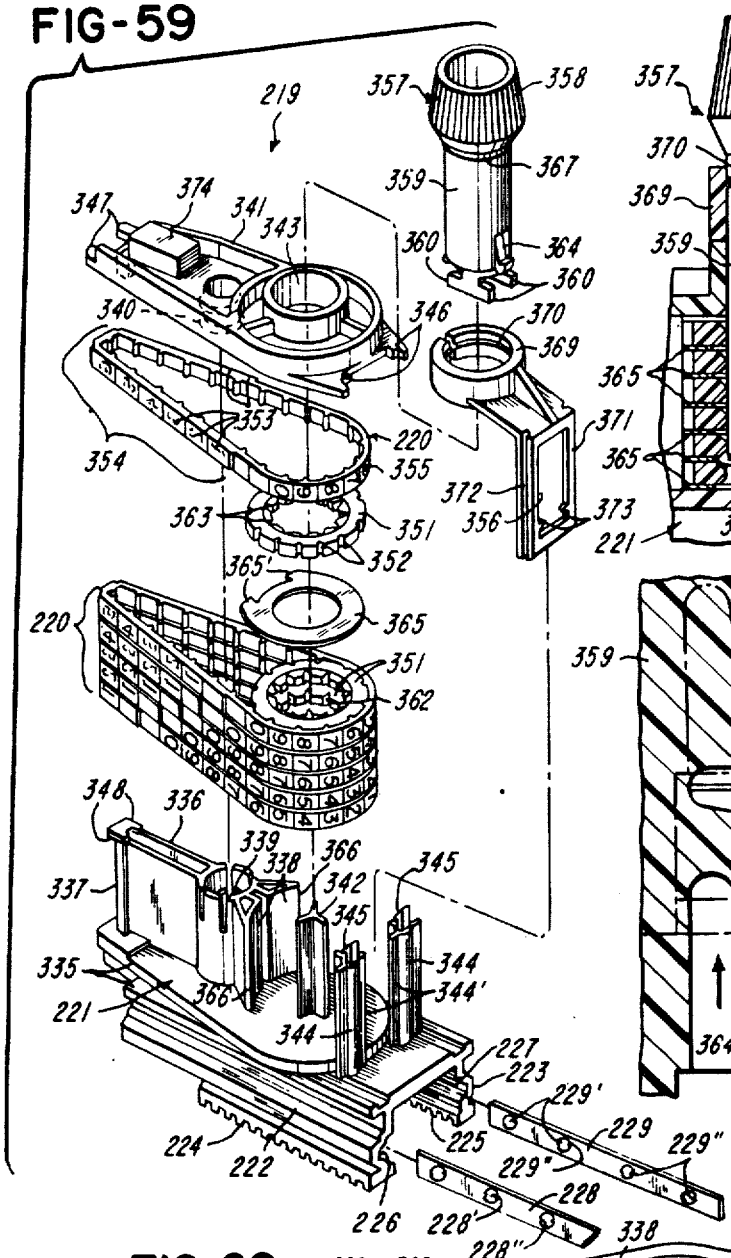
FIG-61
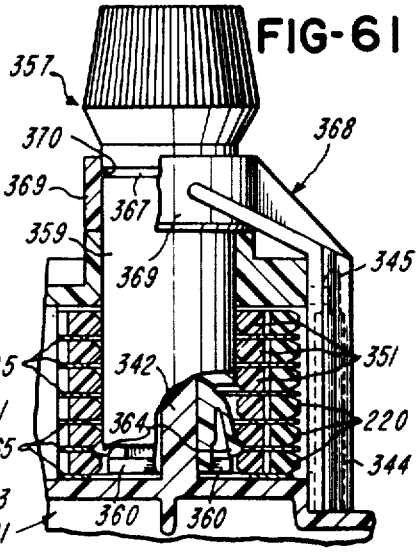
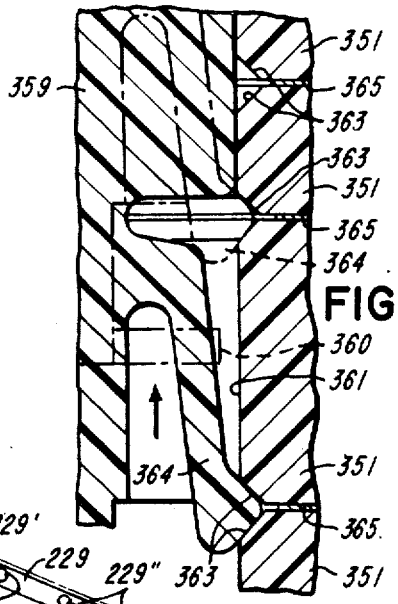
FIG-62
FIG-60
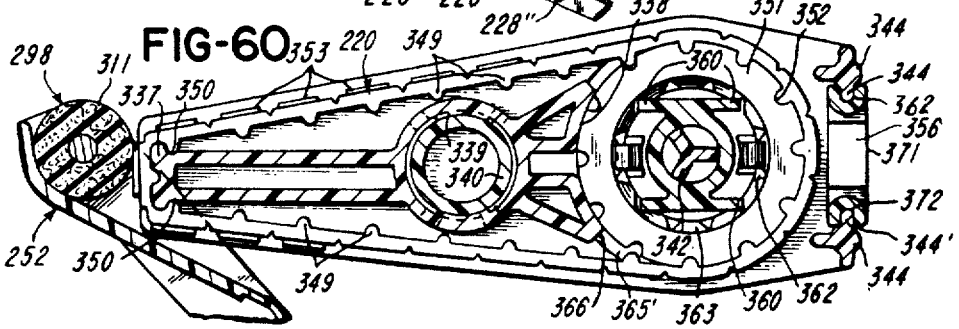

FIG-67
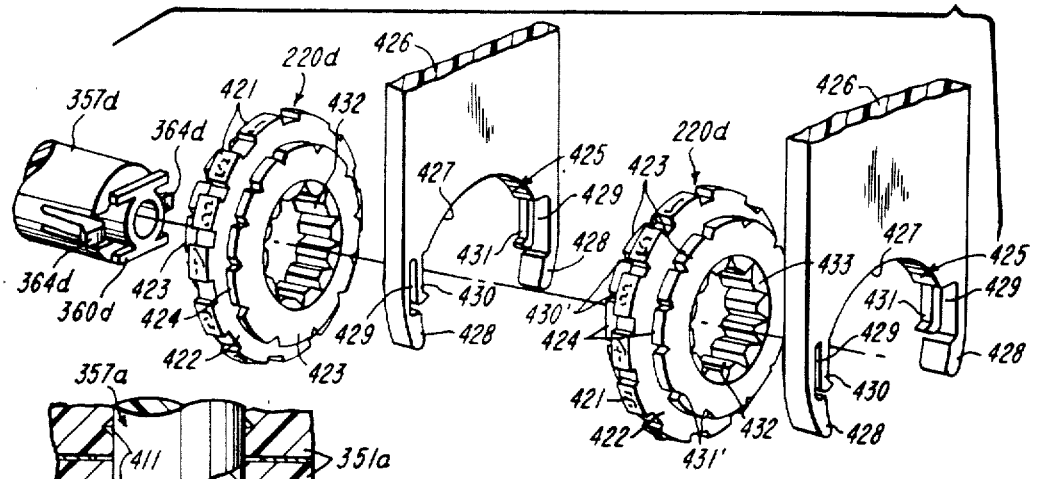
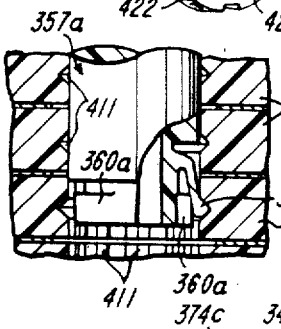
FIG-63
FIG-68
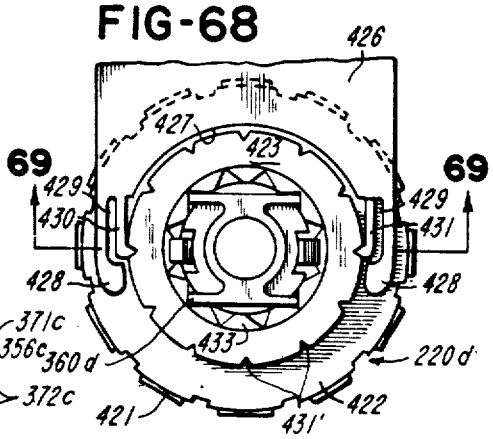
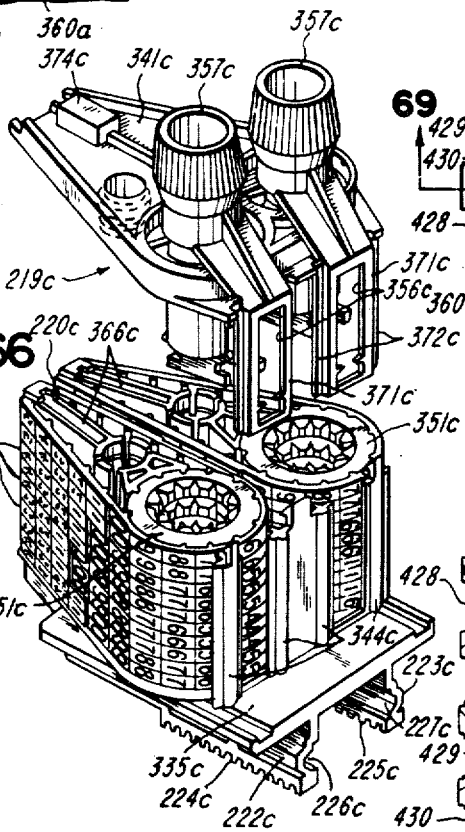
FIG-66
FIG-69
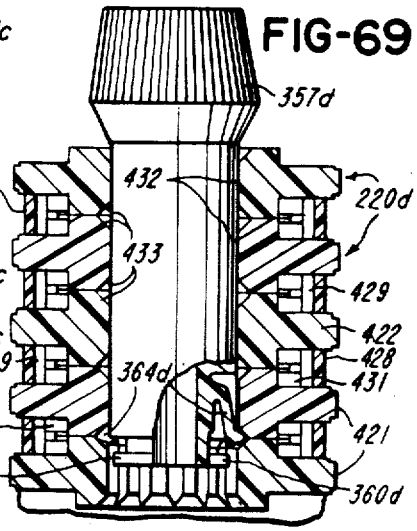

METHOD OF MAKING A COMPOSITE LABEL WEB

Matter enclosed in heavy brackets [ ] appears in the original patent but forms no part of this reissue specification; matter printed in italics indicates the additions made by reissue.

CROSS-REFERENCE TO RELATED APPLICATIONS

This is a division of U.S. application Ser. No. 607,317, filed Aug. 25, 1975, which is a continuation-in-part of application Ser. No. 475,728, filed June 3, 1974, now U.S. Pat. No. 3,948,172, and application Ser. No. 475,730, filed June 3, 1974, now U.S. Pat. No. 3,941,289 which are divisions of U.S. patent application Ser. No. 366,919, filed June 4, 1973, now abandoned, which is a division of U.S. application Ser. No. 206,061, filed Dec. 8, 1971, now U.S. Pat. No. 3,783,083, which is a continuation-in-part of U.S. patent application Ser. No. 155,740, filed June 23, 1971, now abandoned. Certain subject matter disclosed in the present application is claimed in U.S. Pat. Nos. 3,852,139 and 3,852,140, which are assigned to the same assignee as the present application.

BACKGROUND OF THE INVENTION

1. Field of the Invention

This invention relates to the art of pressure sensitive labels and method for making and using same.

2. Brief Description of the Prior Art

Various U.S. Pat. Nos. 1,642,387, 2,259,358, 2,275,064, 2,516,487, 2,620,205, 3,051,353, 3,265,553, 3,501,365, 3,551,251, and 3,611,929 and British Pat. No. 1,057,126, Feb. 1, 1967 are made of record.

SUMMARY OF THE INVENTION

This invention relates to various embodiments of a composite web of pressure sensitive labels. The composite web is comprised of a web of supporting material and a web of label material having pressure sensitive adhesive releasably adhered to the supporting material web. The label material web is separated into labels by butt cuts that extend transversely across the web. The supporting material web is provided with a series of longitudinally spaced apart cuts. Each cut forms at least one flap or flap portion that extends initially in the plane of the supporting material web. In accordance with certain embodiments of the invention one flap or flap portion is formed as for example when the supporting material web is provided with a triangular-shaped cut, or two flaps or flap portions for example are formed [with] *when* an I or T shaped cut is made. The cuts extend completely through the supporting material web and also preferably partly and most preferably entirely through the label material web. The cuts in the labels render the labels more difficult to remove when applied to merchandise. As the cuts in the label material are aligned with the cuts in the supporting material, the composite web can be loaded into a label dispensing apparatus having a toothed driver such as a feed wheel, and the teeth of the driver can poke through the supporting material and the label material at the localized zones of weakening provided by the series of cuts. This obviates the need to strip labels from the end portion of the supporting material web when loading the apparatus. In certain of the embodiments the cuts provide respective trailing flaps or flap portions which are located in the label supply roll such that the flaps extend away from the leading free end of the web and toward the end of the web adjacent, typically, the label core. The provision of trailing flap affords the distinct advantage over a leading flap in that the trailing flap does not fold out of the plane of the web as the supporting material web passes about the delaminator, and consequently tearing of the supporting material web is obviated. The invention is also directed to method of making such composite webs and method of dispensing such composite webs.

BRIEF DESCRIPTION OF THE DRAWINGS

FIG. 11 is a top plan view of still another embodiment of the composite web of labels;

FIG. 12 is a sectional view taken along line 12—12 of FIG. 11;

FIG. 13 is a side elevational view taken along line 13—13 of FIG. 11, showing one side edge of the composite web;

FIG. 14 is a perspective view showing method and apparatus by which the composite web shown in FIGS. 11, 12 and 13 is advanced and by which labels are successively printed and applied to merchandise;

FIG. 15 is a top plan view of another embodiment of the composite web of labels;

FIG. 16 is a side elevational view of the composite web of labels taken along line 16—16 of FIG. 15, showing one side edge of the composite web;

FIG. 17 is a perspective view showing method and apparatus by which the composite web shown in FIGS. 15 and 16 is advanced using a relatively small toothed driver and showing how labels are printed and applied to merchandise;

FIG. 18 is a perspective view showing method and apparatus by which labels can be printed and applied to merchandise using a composite web in accordance with another embodiment of the invention;

FIG. 19 is a perspective view showing the manner in which the composite web shown in the embodiments of FIGS. 1-9 can be made;

FIG. 20 is a fragmentary elevational view showing the manner in which the cuts are formed in the label material and the supporting material by cutters shown in FIG. 19;

FIG. 21 is a perspective view showing the method by which the composite web of the embodiments of FIGS. 11 through 18 can be made;

FIG. 22 is a fragmentary elevational view showing the manner in which the cuts are made in the label material and the supporting material by the cutters shown in FIG. 21;

FIG. 30 is a partly broken away top plan view of another embodiment of the composite web of pressure-sensitive labels;

FIG. 31 is a perspective view showing a fragmentary portion of a toothed driver and supporting material of the composite web according to FIG. 30;

FIG. 32 is a partly broken away top plan view of another embodiment of the composite web of pressure-sensitive labels, like the embodiments of FIGS. 1 through 9, but having an additional group of cuts midway between the end edges of the labels;

FIG. 33 is a partly broken away top plan view of another embodiment of the composite web of pressure-sensitive labels;

FIG. 34 is a partly broken away top plan view of another embodiment of the composite web of pressure-sensitive labels in which the cuts extend only partly through the label material;

FIG. 35 is a sectional view taken along line 35—35 of FIG. 34;

FIG. 36 is a sectional view similar to FIG. 35, but showing perforation cuts entirely through the label material at spaced apart locations;

FIG. 42 is a side elevational view of one of the sub-frame sections of the apparatus;

FIG. 43 is a top plan view taken along line 43—43 of FIG. 42;

FIG. 44 is a side elevational view of the other sub-frame section;

FIG. 45 is a top plan view showing the manner in which the label core for the roll of labels is held and the manner in which braking force is applied by the sub-frame sections;

FIG. 46 is a sectional view taken along line 46—46 of FIG. 45;

FIG. 47 is a sectional view taken generally along line 47—47 of FIG. 38;

FIG. 49 is an enlarged sectional view showing a fragmentary portion of the apparatus in solid lines, and in particular showing a fragmentary portion of the print head and the inking mechanism in both solid and phantom line positions;

FIG. 50 is a sectional view taken along line 50—50 of FIG. 39;

FIG. 51 is a developed view showing the arrangement of the teeth of the detent mechanism;

FIG. 52 is a sectional view taken along line 52—52 of FIG. 50;

FIG. 53 is a sectional view taken generally along line 53—53 of FIG. 50;

FIG. 54 is a sectional view showing one of the three sets of snap-fit connections used to interconnect the frame and the sub-frame;

FIG. 55 is an enlarged view of an applicator roll shown mounted in the frame of the apparatus;

FIG. 56 is a sectional view taken along [the] *line* 56—56 of FIG. 55;

FIG. 57 is a sectional view taken along line 57—57 of FIG. 56, but omitting the shaft and the frictional member;

FIG. 58 is a partly sectional view of the mounting shaft which forms part of the applicator roll;

FIG. 59 is an exploded perspective view of the print head;

FIG. 60 is sectional view of the print head taken generally along line 60—60 of FIG. 38;

FIG. 61 is a sectional view showing the selector in relationship to the associated driven wheels;

FIG. 62 is an enlarged sectional view showing the manner in which detenting of the selector is [effect] *effected*, but showing the driven members as being of different widths;

FIG. 63 is a view similar to a fragmentary portion of FIG. 61, but showing the manner in which detenting can be effected directly on a wheel;

FIG. 64 is an enlarged, partly sectional, elevational view showing an alternative arrangement for constructing the selector;

FIG. 65 is a perspective view showing the driving member depicted in FIG. 64;

FIG. 66 is a partly exploded perspective view of a modified print head in accordance with the invention, which is adapted to print and apply labels such as shown in FIG. 32 or 33;

FIG. 67 is an exploded perspective view of the selector in association with type wheels and mounting structure for the type wheels;

FIG. 68 is an end elevational view of the type wheels and the selector assembled in the mounting members;

FIG. 69 is a sectional view taken generally along line 69—69 of FIG. 68;

DESCRIPTION OF THE PREFERRED EMBODIMENTS

Figures 1, 2, 3, 4, 5, 6, 7, 8, 9, 10:
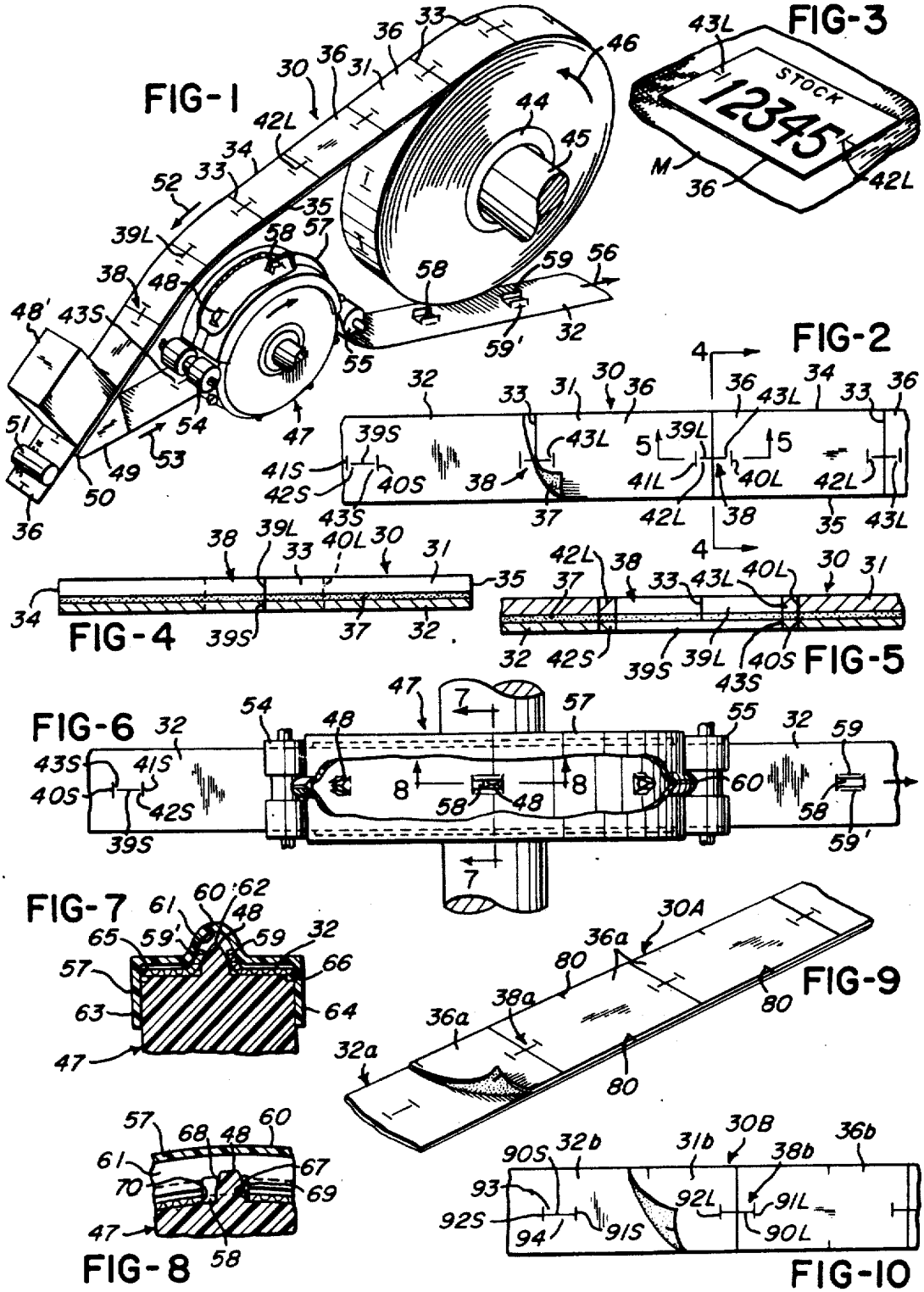
FIG. 1 is a perspective view showing method and apparatus by which one embodiment of a composite web of labels is advanced and by which labels are successively printed and applied to merchandise.
FIG. 2 is a top plan view of the composite web of labels shown in FIG. 1.
FIG. 3 is a perspective view of one of the labels, shown in FIGS. 1 and 2, applied to merchandise.
FIG. 4 is a sectional view taken along line 4—4 of FIG. 2.
FIG. 5 is a sectional view taken along line 5—5 of FIG. 2.
FIG. 6 is a top plan view showing the composite web being advanced by a toothed driver with the web of supporting material.
FIG. 7 is a sectional view taken along line 7—7 of FIG. 6.
FIG. 8 is a sectional view taken along line 8—8 of FIG. 6.
FIG. 9 is a perspective view of another embodiment of the composite web of labels.
FIG. 10 is a top plan view of yet another embodiment of the composite web of labels.

Referring to the embodiment of FIGS. 1 through 8, and in particular to FIGS. 2, 3 and 4, there is shown a composite web 30 of label material 31 releasably adhered to and carried by supporting or backing material 32. The label material 31 is cut transversely by transverse cuts 33 extending all the way across the web [331] *31* of label material to the side edges 34 and 35 of the composite web 30, as best shown in FIGS. 2 and 4. The cuts 33 known as "butt cuts" separate the web 31 of label material into a series of end-to-end labels 36. The side edges of the label material as well as the supporting material are straight and the label material is coextensive with the supporting material.

The underside of the web 31 of label material has a coating of pressure sensitive adhesive 37 which adheres strongly to the web 31 of label material. The adhesive is shown to extend across the entire underside of the label material even to the side edges 34 and 35 of the web 30. The web 32 of supporting material carries a thin film or coating (not shown) which allows the labels to be peeled from the web 32 of supporting material.

Figure 25:
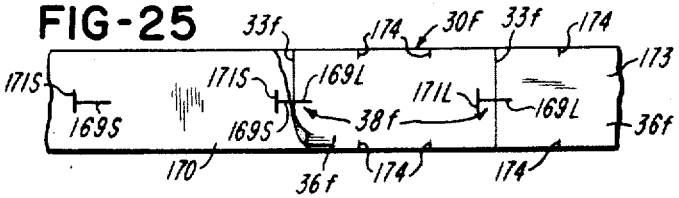
FIG. 25 is a partly broken away top plan view of another embodiment of the composite web of pressure-sensitive labels.

Groups 38 of cuts are provided at equally spaced apart intervals along the length of the composite web 30. Each group 38 of cuts is shown to extend through the supporting material as well as through the label material. Each group 38 of cuts is shown to be made in a generally I-shaped configuration comprised of a straight longitudinal or vertical bar cut 39S in the supporting material and an aligned straight longitudinal or vertical bar cut 39L in the label material. Spaced from the one ends of the vertical bar cuts 39S and 39L are straight transverse or horizontal bar cuts 40S in the supporting material and 40L in the label material. Spaced from the other ends of the vertical bar cuts 39S and 39L are aligned straight transverse or horizontal bar cuts 41S in the supporting material and straight transverse or horizontal bar cuts 41L in the label material. The part of the web 32 between the one end of the cut 39S and the cut 40S provides a frangible portion 43S and the part of the web 32 between the other end of the cut 39S and the cut 41S provides a frangible portion 42S. In like manner, the part of the label material between the end of the cut [32L] *39L* and the cut 40L provides a frangible portion 43L and the part between the other end of the cut 39L and the cut 41L provides a frangible portion 42L. As a variation of the illustrated groups 38 of cuts, the cuts 40L and 40S can be omitted in which event the cut 39S will be extended by tearing as the tooth 48 engages the web 32 at the cut 39S; this would result in groups of cuts each having a generally T-shaped configuratiion as shown in FIG. 25.

With reference [noew] *now* to FIG. 1, the composite web 30 is shown to be in the form of a roll which can be wound on a core 44, as desired. The core 44 can receive a shaft 45 about which the roll is free to rotate in the direction of arrow 46. The roll is wound in such a manner that the label material is one the outside in overlying relationship with respect to the web 32 of supporting material.

A toothed driver generally indicated at 47 is shown to be in the form of a driven sprocket having teeth 48 disposed in a plane at equally spaced apart angular positions around the circumference of the driver 47. The driver 47 is used to advance the composite web first to a printing zone at which a printer 48' and a platen 49 are disposed. A relatively sharp peel edge 50 is diagrammatically illustrated as being disposed at the terminal end of the platen. The web of supporting material 32 is drawn around the peel edge 50 by the toothed driver 47. The edge 50 causes the supporting material 32 to make an abrupt change in direction, thereby effecting delamination or peeling of the supporting material 32 from one label 36 at a time as the web of supporting material is concomitantly advanced by the toothed driver 47. An applicator 51 is positioned beyond the peel edge 50 and on the same side of the label as the printer 48'. The applicator 51 is shown to take the form of a conventional applicator roll, however, other types of applicators such as a plunger, a presser foot, or the like can be used, if desired. The composite web 30 approaches the printing and applying zones generally in the direction of an arrow 52, and after passing around the peel edge 50 the web 32 of supporting material advances generally in the direction of arrow 53 and passes partially around a guide roller or shaft 54. From the guide roller 54, the web 32 passes partially around the toothed driver 47. From there the web 32 passes partially around a guide roller or shaft 55 and from there the web 32 is guided by means of guides in the direction of the arrow 56. The toothed driver 47 is driven stepwise by a pawl and ratchet mechanism so that upon operation of this mechanism the composite web 30 is advanced through the appropriate distance so that the labels can be printed at one or more stages and so that a label is brought to the applying zone at which the applicator 51 is effective to apply the dispensed label to merchandise M. The web 32 passes between the outer surface of the toothed driver 47 and a guide or hold down plate 57 as shown in FIGS. 1, 6, 7 and 8. As the driver 47 rotates, successive teeth engage successive groups of cuts in the web 32. As a tooth engages the web 32 at a longitudinal cut 39S frangible portions 42S and 43S are severed as by tearing to provide a feed hole 58. The feed hole 58 thus formed receives the tooth 48 and deflects flaps 59 and 59'.

As best seen in FIG. 7, the guide 57 has a concave section 60 with a groove 61 in the same plane as the teeth 48. The transversely extending flaps 59 and 59' are shown to enter the groove 61 when the tooth 48 is in the feed hole 58. As best shown in FIGS. 6 and 7, each tooth 48 terminates at a sharp pointed end 62 which serves to facilitate [serving] *severing* of the frangible portions 42S and 43S. The guide 57 has flanges 63 and 64 which are in guiding engagement with edges 65 and 66 of the web 32.

The spacing of the teeth 48 around the periphery of the driver 47 is the same as the spacing of the groups 38 of cuts lengthwise of the composite web 30. The teeth 48 are identical and only one is shown in detail in side elevation in FIG. 8. In FIG. 8, the tooth 48 is shown to have involute contoured faces 67 and 68 which enable it to readily make a feed hole 58 in the web 32 which has passed partially around guide [roller] *rollers* 54 and to move out of the feed hole easily just before the web 32 passes partially around the roller 55. As shown in FIG. 8 the face 67 of the tooth 48 is shown to be in driving engagement with the leading edge 69 of the feed hole 58. The face 68 of the tooth 48 is shown to be slightly spaced from trailing edge 70 of the feed hole.

The groups of cuts 38 do not substantially affect the integrity of the web 32 until feed holes are made by the teeth of the driver 47 or the like. There are no flaps or lids as in the prior art which result in weakening of the web 32 at the delaminating zone where the strength of the web is particularly important. Also there are no flaps to result in possible interference with the feeding of the web. In addition, the types of cuts forming the group 38 make it feasible for the composite web 30 to be fed in either direction with equal efficacy. With the prior art U.S. pat. to E. C. Marshall No. 3,501,365 the composite web can be fed in only one direction using the cut edge. The invention is not limited to providing a group 38 of cuts across the marginal ends of each label; while this is the preferred arrangement, the group 38 of cuts can extend across the marginal end of every other label, or the groups 38 of cuts can be disposed within the periphery of each label or of every other label, if desired.

The embodiment of the composite web 30A shown in FIG. 9 is identical to the embodiment of the composite web 30 and is used in the same manner, except the composite web 30A has at least one short straight transverse cut 80 in each marginal edge of each label 36a. There are, however, no cuts in the marginal edge of web 32a of supporting material. The cuts 80 serve further to prevent switching of the labels 36a once they have been applied to merchandise.

The embodiment of the composite web 30B shown in FIG. 10 is identical to the embodiment of the composite web 30A, except that the individual cuts of each group of longitudinally spaced apart groups 38b of cuts intersect. Specifically, the composite web 30B has a web 31b of label material an a web 32b of supporting material. The web 32b of supporting material has longitudinal or vertical bar cuts 90S which extend to transverse or horizontal bar cuts 91S and 92S. The cuts 90S, 91S and 92S define transversely extending flaps or [lipds] *lips* 93 and 94. The composite web 30B can be delaminated and advanced by the same apparatus as shown in FIGS. 1 and 6 through 8. The cuts 91S and 92S provide feed holes that the teeth 48 of the toothed driver can enter as the driver 47 rotates.

A longitudinal or vertical bar cut 90L is made in the label material simultaneously with the making of the cut 90S, and therefore these two cuts are in alignment. Cuts 91L and 92L are made in the label material simultaneously with the making of the cuts 91S and 92S, and therefore the cuts 91L and 92L are in alignment with respective cuts 91S and 92S. The cuts 90L, 91L and 92L in the label material provide a generally T-shaped cut in each marginal end of each label 36B and hence tend to prevent switching of the labels once they have been applied to merchandise.

Referring to the embodiment of FIGS. 11 through 14, there is shown a composite web 30C comprised of a web of label material 31c. Transverse equally spaced apart cuts extend entirely across the web 31c of label material at equally spaced intervals to [proide] *provide* labels 36c. Space apart short transverse cut 100S are formed in both marginal side edges of the web 32c. Short straight transverse cuts 100L are disposed in each marginal side edge of the label material 31c in alignment with respective cuts 100S in the web 32c of supporting material. Each cut 100S in the supporting material and the associated cut 100L in the label material are preferably made simultaneously with the same cutting blade. With reference to FIG 14 a toothed driver 47c is shown to be rotating and in driving engagement with the web 32c of supporting material to effect advance of the composite web 30c. As teeth 48c engage the web 32c they effect deflection of flaps 101 facilitated by a pair of adjacent cuts 100S, one cut 100S of each pair of cuts provides a drive face 102 at the place where the leading edge of the respective tooth 48c engages it.

Referring to the [embdiment] *embodiment* of FIGS. 15, 16 and 17, composite web 30D is identical to the composite web 30C in the embodiment of FIGS. 11 through 14 except that both the label material 31d and the web 32d of supporting material are provided with a group of at least three spaced apart cuts rather than a pair of spaced apart cuts. Specifically, transverse equally spaced apart groups of cuts 110S are made in the web 32d of supporting material. Short transverse cuts 110L are disposed in each marginal side edge of the web 31d of label material in alignment with [respect] *respective* cuts 110S in the supporting material. Each cut 110S in the supporting material and the associated cut 110L in the label material are preferably made simultaneously with the same cutting blade. With reference to FIG. 17 a toothed driver 47d is shown to have a substantially smaller diameter than the toothed driver 47c (FIG. 14). The composite web 30D is preferably made with at least three cuts in that the toothed driver 47d has a small diameter and in that it is easier for the flaps 111 formed by the cuts 110S to be deflected as the web 32d passes around the toothed driver 47d. Adjacent flaps 111 of a group of flaps extend outwardly and make an acute angle with respect to each other. The labels are indicated at [36j] *36d.*

Referring now to FIG. 18, there is shown a composite web 30E' having a web of label material 31e' and a web 32e' of supporting material. The web 32e' is engaged by a toothed driver 47e' having triangularly shaped teeth 48e'. Transverse equally spaced apart cuts 33e' extend entirely across the web 31e' of label material at equally spaced apart intervals to provide labels 36e'. Spaced apart short transverse cuts 120S are formed in both marginal side edges of the web 32e'. Short transverse cuts 120L are formed in each marginal side edge of the label material 31e' in alignment with respective cuts 120S in the web 32e'. Each cut 120S in the supporting material and the associated cut 120L in the label material is preferably made simultaneously with the same cutting blade. The toothed driver 47e' is shown to be rotating in driving engagement with the web 32e' of supporting material to effect advance of the composite web 30E'. The teeth 48e' effect deflection of flaps 112 and engage drive faces 113 at one side of each cut 120S.

Referring to FIGS. 19 and 20 there is shown a wide composite web 30AW, for example, for making the composite web 30A. The web 30AW is shown being advanced in the direction of arrow A. The composite web 30AW is comprised of the label material 31a adhesively secured to a web 32a of supporting material passing between cutter roll 130 having a plurality of knives 131 and a cooperating backup roll 132. The knives 131 travel at the same linear speed as the speed of the web 30AW and serve to cut through the web 31a of label material across its entire width to make the cuts 33. A cutter roll 133 and a backup roll 134 are disposed beyond the cutter roll 130 and the backup roll 132. As the composite web 30AW passes between the cutter roll 133 and the backup roll 134, knife blades or knives 135, 136 and 137 make transverse cuts 80 in only the web 31a of label material. Thereafter two lines of printing P are printed on the web 31a by print drum 138 and a cooperating platen roll 139. From there the composite web 30AW passes between a cutter roll 140 and a cooperating platen roll 141. The cutter roll 140 has spaced apart groups 38K of cutter blades or knives. Each group 38K of cutter knives comprises a longitudinal or vertical bar cut knife 39K, transverse or horizontal bar cut knife 40K and transverse or horizontal bar cut knife 41K. Each group 38K of knives makes one group of cuts 38a in the composite web 30A. As best shown in FIG. 20, the knives 39K, 40K and 41K cooperate with the platen roll 141 with zero clearance. Accordingly, each of the knives 39K, 40K and 41K cut entirely through the web 31a and the web 32a, whereas knives 131 and 135, 136 and 137 of the respective cutter rolls 130 and 133 cut entirely through the label material 31a but not into the web 32a.

After passing between the cutter roll 140 and the platen 141 the composite web 30AW is slit into a plurality of composite webs 30A by cooperating slitter elements 142 and 143. Each composite web 30A can now be formed into rolls.

Referring now to FIGS. 21 and 22, there is shown a composite web 30DW traveling in the direction of arrow A1. The web 30DW passes between cutter roll 150 and platen roll 151. The cutter roll has spaced apart cutter blades or knives 152 for making cuts 33d at equally spaced apart intervals along the length of the web 30DW. Spaced beyond the cutter roll 150 and the platen 151 are cutter rolls 153 and a cooperating platen roll 154. The cutter roll 153 has groups of knives 110K for making cuts 110L in the label material and for simultaneously making cuts 110S in the supporting material. Spaced beyond the cutter roll 153 and the platen roll 154 are cooperating slitter elements 155 and 156 which slit the web 30DW into a plurality of composite webs 30D, and these composite webs 30D can be formed into rolls. As evident from FIG. 22, a cutter blade 152 cuts only through the label material 31d and not into the web 32d of supporting material. However, the cutter blades or knives 110K are set to zero clearance with respect to the platen roll 154 so that each cut 110S and its associated cut 110L are made simultaneously by the respective knife 110K.

Figure 23:
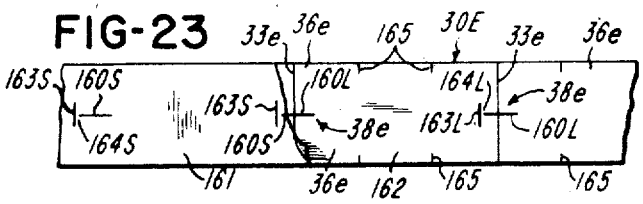
FIG. 23 is a partly broken away top plan view of another embodiment of the composite web of pressure-sensitive labels.
Figure 24:
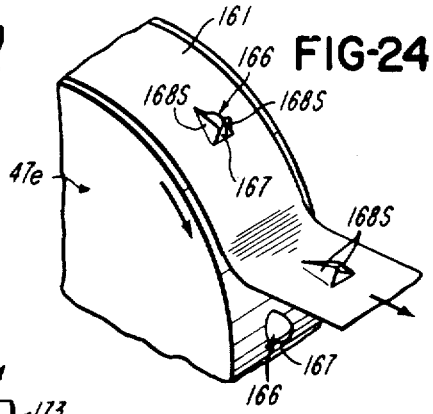
FIG. 24 is a perspective view showing a fragmentary portion of a toothed driver and supporting material of the composite web according to FIG. 23.

Referring to the embodiment of FIG. 23 and FIG. 24, there is shown a composite web 30E which is identical to the composite web 30A (FIG. 9), except that the composite web 30E has a group 38e of cuts illustrated as being arranged in a generally T-shaped configuration. The group 38e of cuts is shown to be comprised of a straight longitudinal or vertical bar cut 160S in supporting material 161 and an aligned straight longitudinal or vertical bar cut 160L in label material 162. Spaced from the one ends of the longitudinal cuts 160S and 160L are horizontal or transverse bar cuts 163S in supporting material 161 and 163L in label material 162. The part of the supporting material 161 between the one end of the cut 160S and the cut 163S provides a frangible portion 164S and the part of the label material 162 between one end of the cut 160L and the cut 163L provides a frangible portion 164L. The label material 162 is provided with transverse cuts 33e extending all the way across the web 162 of label material as shown in FIG. 23. The cuts 33e separate the label material 162 into labels 36e. The composite web 30E differs from the embodiment of FIG. 9 in that it is shown to have a pair of short straight transverse cuts 165 in each marginal edge of the labels 36e. There are, however, [not] *no* cuts in the marginal edge of the supporting material 161. The cuts 165 serve to prevent switching of the labels 36e when applied to merchandise.

FIG. 24 shows a fragmentary portion of a toothed driver 47e having a tooth 166 of a generally triangular shape but having a drive face 167 curved like the drive face 67 of of driver 47. As a tooth 166 initially engages the supporting material 161, it will cause rupture of the frangible portion 164S and the tooth 166 will cause triangular-shaped flaps 168S to be formed as best shown in FIG. 24. One tooth 166 is shown to be in driving engagement with the web of supporting material 161 and the other tooth 166 is shown to be out of engagement with the supporting material 161.

The embodiment of FIG. 25 is like the embodiment of FIG. 23 in providing generally T-shaped groups 38f of cuts, except that with the composite web 30F, longitudinal or vertical bar cuts 169S in supporting material 170 meet transverse or horizontal bar cuts 171S. There are aligned longitudinal or vertical bar cuts 169L and transverse or horizontal bar cuts 171L in the label material 173. Transverse cuts 33f separate the label material 173 into labels 36f. Composite web 30F has short straight transverse cuts 174 in each marginal side edge of the labels 36f. There are, however, no cuts in the marginal side edges of the supporting material 170. The composite web 30F can be fed by the toothed driver 47e shown in FIG. 24.

Although the arrangement of cuts disclosed in FIGS. 10 and 25 diminishes the integrity of the web of supporting material, this construction is substantially entirely free of the deficiency of folding a flap or chad out of the plane of the web during delamination as in U.S. Pat. No. 3,501,365. Such folding out of a flap causes some adhesive, or gum as it is known in the art, adhering to the edges of the flap or chad to be pulled away from the label material during delamination. In addition, such a folded out flap or chad will transfer the adhesive to guiding and feeding surfaces of the apparatus and flap can cause interference to feeding when pulling on the web of supporting material by means of a toothed driver.

Figure 26:
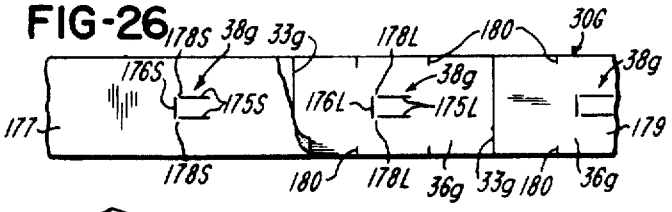
FIG. 26 is a partly broken away top plan view of another embodiment of the composite web of pressure-sensitive labels.
Figure 27:
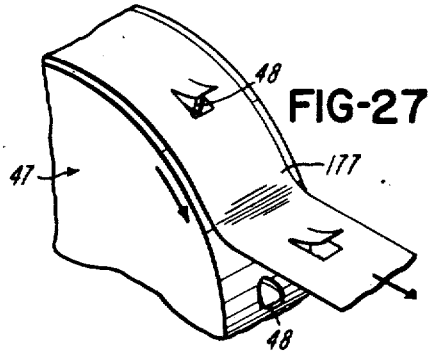
FIG. 27 is a perspective view showing a fragmentary portion of a toothed driver and supporting material of the composite web according to FIG. 26.

Referring to the embodiment of FIG. 26, there is shown a composite web 30G. Each group 38g of cuts, is shown in a U-shaped arrangement, and is comprised of transversely spaced apart longitudinal cuts 175S and a transverse cut 176S in the web of supporting material 177. The cuts 175S are spaced from and in alignment with the ends of the cut 176S. The part of the supporting material 177 between the ends of the cuts 175S and the cut 176S provide frangible portions 178S. Label material 179 has transversely spaced apart cuts 175L and a transverse cut 176L. The horizontal cuts 175L are spaced from the ends of the transverse cut 176L to provide frangible portions 178L. The label material 179 is provided with transverse cuts 33g to provide the labels 36g. The composite web 30G has short, straight transverse cuts 180 in each marginal side edge of the labels 36g. There are, however, no cuts in the marginal side edges of the supporting material 177. It is preferred to use the composite web 30G with the driver 47 with its teeth 48 which are shaped in the manner best shown in FIGS. 7 and 8 rather than teeth 166 of a triangular shape as shown in FIG. 24.

Figure 29:
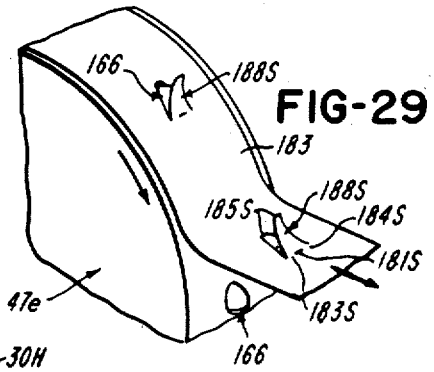
FIG. 29 is a perspective view showing a fragmentary portion of a toothed driver and supporting material of the composite web according to FIG. 28.
Figure 28:
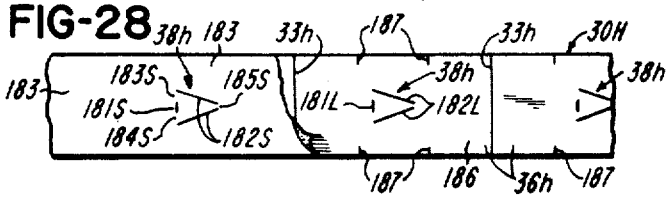
FIG. 28 is a partly broken away top plan view of another embodiment of the composite web of pressure-sensitive labels.

In the embodiment of FIG. 28, there is shown a composite web 30H having groups 38h of cuts at regularly spaced apart intervals. Each group 38h of cuts has a short transverse cut 181S and a pair of converging cuts 182S in the web of supporting material 183. The leading ends of the cuts 182S are in transverse alignment with the transverse cut 181S. The one cut 182S is spaced from the one end of the cut 181S to provide a fold line 183S. The other cut 182S is spaced apart from the other end of the transverse cut 181S to provide a fold line 184S. The other ends of the cuts 182S are spaced apart to provide a frangible portion 185S. Cuts 181L and 182L are provided in web of label material 186 in alignment with respective cuts 181S and 182S in the supporting material 183. The cuts 181L, 182L, and short straight transverse cuts 187 serve to prevent switching of the labels when applied to merchandise. In the embodiment of FIG. 28 it is preferred that each group 38h of cuts be disposed between the end edges of labels 36h defined by transverse cuts 33h. As shown in FIG. 29, toothed driver 47e shows a tooth 166, which has ruptured the frangible portion 185S in supporting material 183, in driving engagement with the supporting material 183. It is evident that flap 188S folds along each cuts 181S and the respective fold lines 183S and 184S. To insure rupturing of the frangible portion 185S, the length of the frangible portion 185S is about one-half as long as the fold line 183S and one-half as long as the fold line 184S. The lengths of the fold lines 183S and 184S and the cut 181S are equal.

Referring to the embodiment of FIG. 30, there is provided a composite web 30K having groups 38k of cuts. Each group 38k of cuts includes curvilinear cuts 197S in a web of supporting material 198. The one ends of the cuts 197S are spaced apart by a relatively substantial distance transversely of the composite web 30K. The other ends of the cuts 197S are spaced apart only a relatively small distance by a frangible portion 198S. The group 38k of cuts also includes curvilinear cuts 197L in web of label material 199. The cuts 197L are in alignment with the cuts 197S in the supporting material 198. Transverse cuts 33k in the label material 199 define the ends of the labels 36k. The cuts 197L and cuts 200 in the label material 199 serve to prevent switching of the labels once they have been applied to merchandise.

With reference to FIG. 31, the toothed driver 47e is shown to be in driving engagement with the web of supporting material 198. One of the teeth 166 is shown to have ruptured the frangible portion 198S and to be in driving engagement with the supporting material 198.

FIG. 32 shows an embodiment of a composite web 30L which is identical to the embodiment of FIG. 9, except that a composite web 30L is shown to have an additional group 381 of cuts between the marginal end edges of labels 361 formed by transverse cuts 331. In addition, each label 361 is shown to have two short transverse cuts 201 at each marginal side edge.

FIG. 33 shows a composite web 30M of labels which is identical to the composite web shown in FIG. 23, except that an additional group 38m of cuts is provided between the end edges of the labels formed by transverse cuts 33m.

FIG. 34 shows another embodiment of the composite web 30N which is identical to the composite web 30 (FIG. 2), except that the groups 38n of cuts penetrate, that is extend only partially through the label material 202 as best shown in FIG. 35. It is also apparent from FIG. 35 that the group 38n of cuts extends entirely through the supporting material 203. While the construction shown in FIGS. 34 and 35 does substantially weaken the label material so as to render the labels 36n more difficult to switch once they have been applied to merchandise, they are less effective in this connection than would be the case as in the embodiment of FIG. 9, for example. FIG. 36 is a view similar to FIG. 35 but showing where the longitudinal cut is made partially through the label material 204 by perforating instead of completely cutting through the label material as in the embodiments of FIGS. 1 through 9 or as opposed to the partial cutting through the label material 202 as disclosed in FIGS. 34 and 35. Thus, in the embodiment of FIG. 36, composite web 30P has the group 38p of cuts entirely through supporting material 205 and through the label material 204 at spaced apart locations leaving tangs or lands 206 or the like between through-cuts 207.

It is within the scope of the invention to make the cuts 33, 39L, 39S, 40L, 40S, 41L, 41S, 90L, 90S, 91L, 91S, 92L, 92S, 33c, 100L, 100S, 110L, 110S, 33e', 120L, 120S, 33e, 160L, 160S, 163L, 163S, 33f, 169L, 169S, 171L, 171S, 33g, 175L, 175S, 176L, 176S, 33h, 181L, 181S, 182L, 182S, 33k, 197L, 197S, and 331, by means of scoring, perforating or the like instead of by completely cutting through the respective label or supporting material. It is, however, preferred to make each of those cuts which is to define a feed edge a through cut rather than a score or perforation cut.

Figure 37:
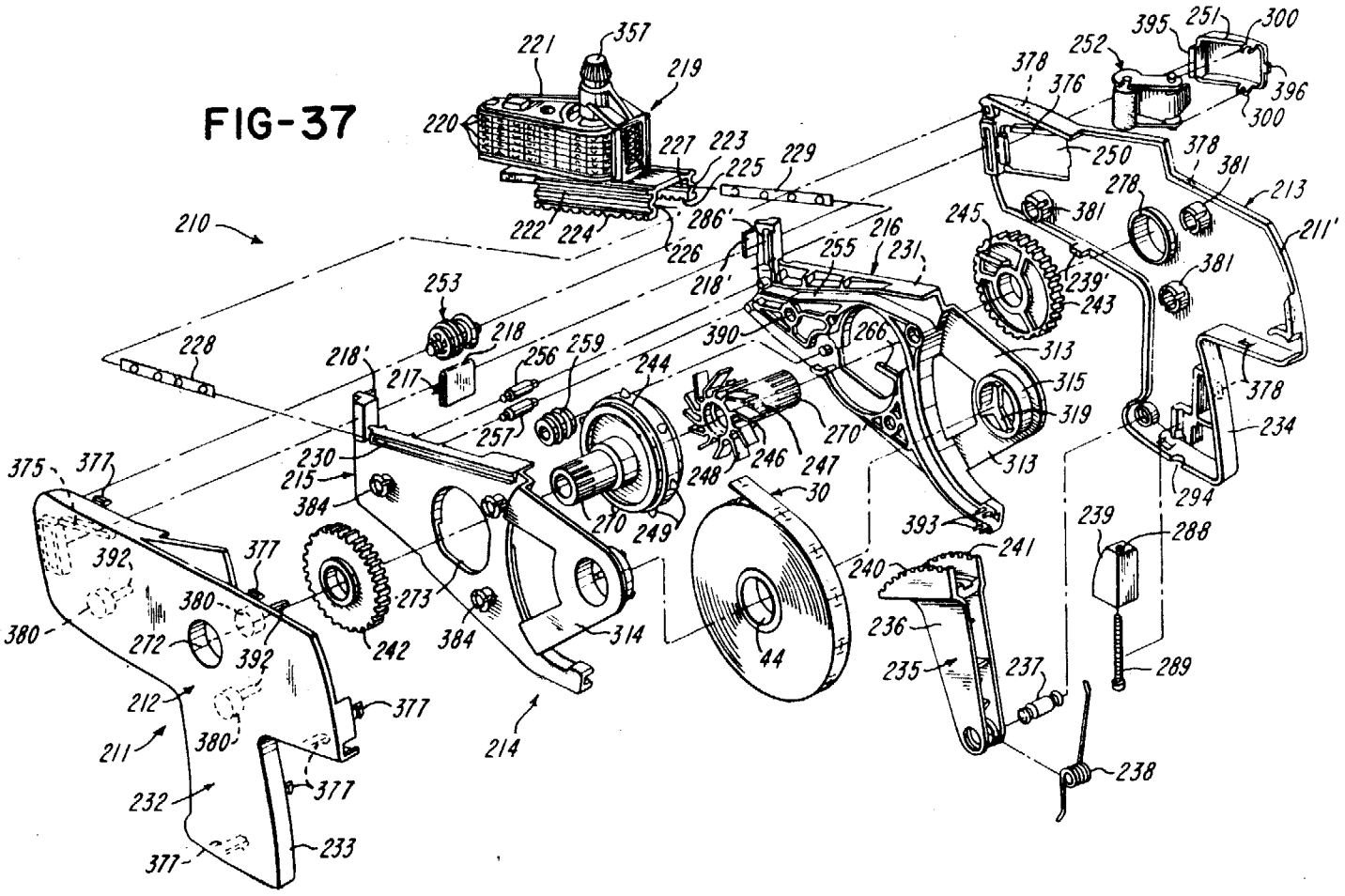
FIG. 37 is an exploded perspective view of label printing and applying apparatus for carrying out the method of the invention.

Referring now to a label printing and applying apparatus generally indicated at 210 in the embodiment of FIGS. 37 through 62, and initially to FIG. 37, there is shown to be a housing or main frame generally indicated at 211. The housing or frame 211 is specifically shown to include a pair of frame sections 212 and 213. Disposed within the housing 211 is a subframe generally indicated at 214 which comprises a pair of subframe sections 215 and 216. The frame sections 212 and 213 mount a platen 217 which includes a peel edge 218. A print head generally indicated at 219 is mounted by the subframe 214. More specifically, the print head 219 includes a plurality of selectable settable printing members 220 in the form of endless printing bands mounted by a print head frame 221. Extending from the frame 221 are a pair of flanges 222 and 223. Gear sections or specifically racks 224 and 225 are provided at the ends of the respective flanges 222 and 223. Opposed tracks 226 and 227 are formed on the respective flanges 222 and 223 to receive straight ball bearings 228 and 229. The subframe sections 215 and 216 have respective trcks 230 and 231. The ball bearing 228 is received in the track 226 of the flange 222 and in the track 230, and the ball bearing 229 is received in the track 227 in the flange 223 and in the track 231. The ball bearings 228 and 229 have respective balls 228' and 229' rotatably held by respective tangs or holders 228" and 229". In this manner, the print head 219 is mounted for movement, particularly reciprocating movement, toward and away from the platen 217.

The housing 211 has a handle generally indicated at 232 and particularly each housing or frame section 212 and 213 has a respective handle portion 233 and 234. An operator generally indicated at 235 is shown to comprise a pivotally operated lever 236 pivotally mounted by a post 237 at the lower end of the handle 232. The lever 236 is normally urged in a counterclockwise direction (FIG. 37) by a torsion spring 238 received about the post 237. The pivotal movement of the lever 236 is limited by an adjustable stop block 239 received by the handle 232 between the handle portions 233 and 234. The upper end of the operating lever 235 carries a pair of spaced-apart gear sections 240 and 241. The gear sections 240 and 241 are shown to be in the form of spur gear segments. Gear sections 240 and 241 are in meshing engagement with respective spur gears 242 and 243. The spur gears 242 and 243 are in meshing engagement with respective gear sections 224 and 225 carried by the print head 219.

A roll of pressure sensitive labels, in the form for example of the composite web 30 shown in FIG. 2, is mounted by its core 44 by the sub-frame 214. As will be described in greater detail hereinafter, the composite web 30 is drawn off the roll into overlying relationship with respect to the platen 217 and the supporting material 32 is engaged by a toothed driver 244. The gear 243 carries an integral pawl 245 cooperable with a ratchet wheel 246 which is coupled to the driver 244 by a detent mechanism generally indicated at 247. An input or drive member 248 of the detent mechanism 247 is shown in FIG. 37. The toothed driver 244 has a plurality of equally spaced apart drive teeth 249 arranged about its outer periphery. The pawl 245 is integrally joined at but one end to the gear 243. The pawl 245 is flexible and resilient and can ride on the ratchet wheel 246 and deflect into engagement with a tooth 265 of the ratchet wheel 246.

The housing of frame section 213 has an access opening 250. A cover 251 is removably connected to the frame section 213 at the access opening 250. The cover 251 mounts an inking mechanism 252 cooperable with the printing members 220 of the print head 219. The housing sections 212 and 213 mount an applicator 253 disposed downstream of the peel edge 218.

Figures 38, 39, 40, 41, 48:
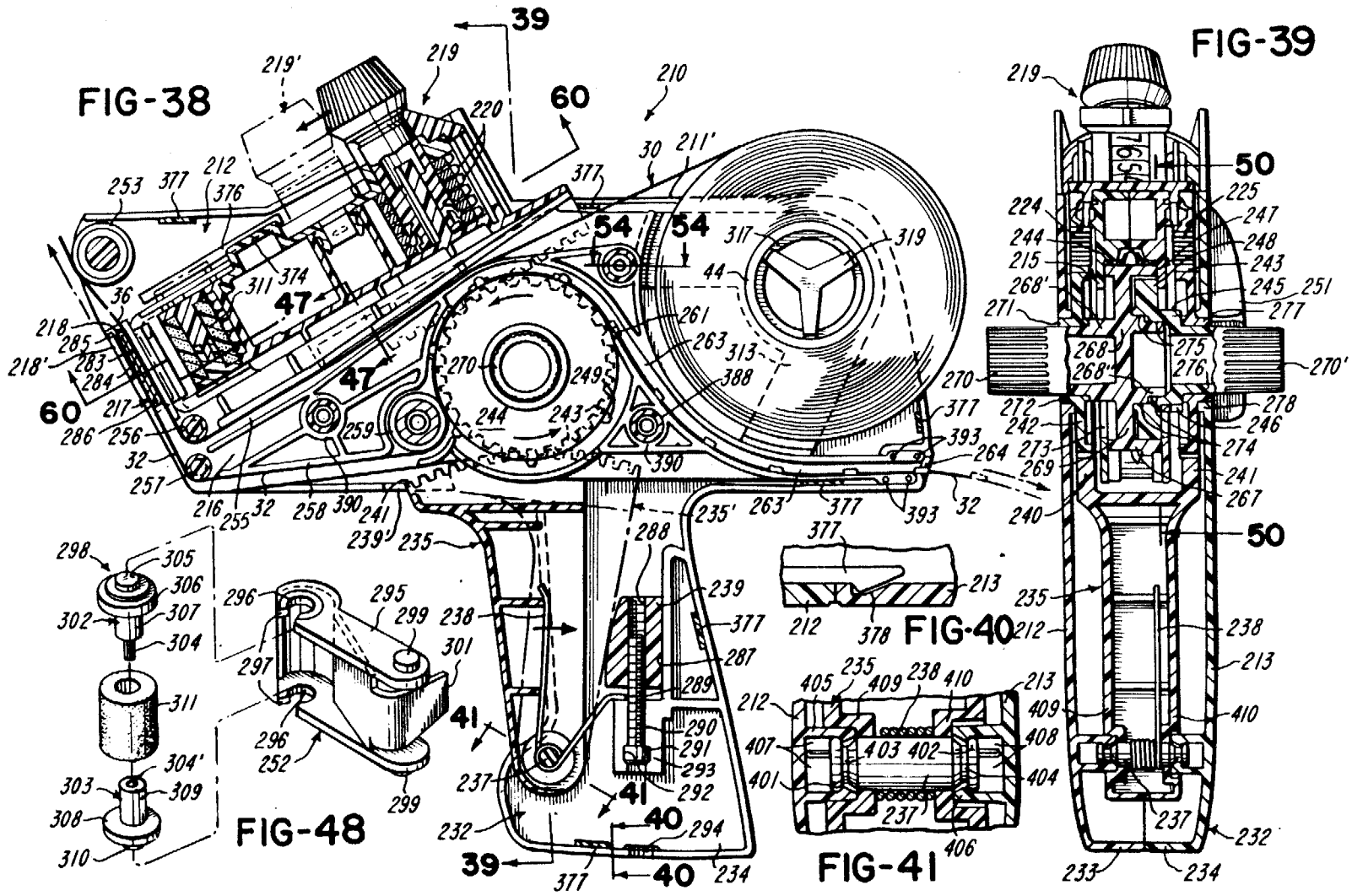
FIG. 38 is a sectional elevational view of the apparatus shown in FIG. 37.
FIG. 39 is a sectional view taken generally along line 39—39 of FIG. 38.
FIG. 40 is a sectional view taken along line 40—40 of FIG. 38.
FIG. 41 is a sectional view taken along line 41—41 of FIG. 38.
FIG. 48 is an exploded perspective view of the inking mechanism.

Referring to FIG. 38, the interrelationship of the components of the apparatus 210 is shown in detail. The composite web 30 is paid out of the roll and passes through a passage provided by subframe sections 215 and 216 and specifically by groove 254 (FIG. 44) in the subframe section 215 and a cooperating groove 255 (FIGS. 37, 38 and 42) in the subframe section 216. From there the composite web 30 passes partly around a roll 256 and into overlying relationship with the platen 217. Delamination is effected at the peel edge 218 formed at the end of the platen 217. The supporting material 32 is drawn around the peel edge 218 beneath the platen 217 and passes partly around a roll 257, below the guide 258 and between the toothed driver 244 and the mating die wheel 259. As a tooth 249 moves into mating cooperation with the die wheel 259, the tooth 249 engages the supporting material 32 at the longitudinal cut 39S and effects rupturing or bursting of the frangible portions 42S and 43S, whereupon the tooth 249 which is in mating cooperation with the die wheel 259 (FIG. 53) is considered to have formed a feed hole in the supporting material 32. It is preferred that there be three teeth 249 in driving engagement with the supporting material 32 at all times. The subframe sections 215 and 216 have respective aligned strippers 260 and 261 which facilitate disengagement of the teeth 249 with the supporting material 232 as the driver 244 rotates. Opposed guide grooves 262 and 263 formed in the subframe sections 215 and 216 guide the supporting material 32 to an exit opening 264. Excess supporting material which dangles from the apparatus 210 can be readily torn off at the exit opening 264.

With reference to FIG. 38, the print head 219 is shown by solid lines in the initial or home position and by phantom lines 219' in the printing zone in printing cooperation with the label 36 and the platen 217. The operator 235 is shown by solid lines in its initial or home position and in phantom lines 235' in the fully actuated position. In the fully actuated position, the print head 219 has been moved into printing cooperation with the labels 36 and the platen 217, and the operator 235 is in abutment with the stop block 239. In this position of the operator 235, the flexible resilient pawl 245 (FIG. 50), joined integrally at one end to the gear 243, has moved to the position shown by phantom lines 245' in driving cooperation with a tooth 265 of the ratchet wheel 246. When the user releases the operator 235, the spring 238 (FIG. 38) returns the operator 235 against stop 239' to the solid line position shown in FIG. 38. While the operator 235 is returning to the solid line position from the fully actuated position indicated by phantom lines 235', the gear sections 240 and 241 (FIGS. 38 and 39) rotate gears 242 and 243 clockwise (FIG. 38) to return the print head 219 to the solid line position from the position shown by phantom lines 219', and to drive the pawl 245 from the position shown by phantom lines 245' to the position shown in solid lines in FIG. 50. Thus, the pawl 245, which is in engagement with a tooth 265, drives the ratchet wheel 246 counterclockwise (FIG. 50). This counterclockwise rotation of the ratchet wheel 246 (FIG. 50) causes the driver 244 to advance the supporting material 32 to effect substantially complete delamination of a label at the peel edge 218. Counter-clockwise rotation of the ratchet wheel 246 continues until a pawl 266 (FIGS. 37, 42 and 50) in the form of a flexible resilient appendage of the subframe section 216, moves into engagement with a tooth 265 of the ratchet wheel. This prevents the web of supporting material 32 from being accidentally moved in the return direction.

As best shown in FIG. 39, the driver 244 has an annular rim 267 joined to a hub 268 by a radial web 269. The hub 268 has a hub section 268' extending in one direction and another hub section 268'' extending in the opposite direction. The hub section 268' terminates at a knob 270, and the hub section [269''] *268''* terminates at a knob 270'. The gear 242 is rotatably journaled on and with respect to the hub section 268'. The gear 242 has a hub or flange 271 which is rotatably journaled in opening 272 in the frame section 212. The hub section 268' extends through an enlarged opening 273 in the subframe section 215. The hub section 268'' provides a stepped pair of bearing surfaces 274. The ratchet wheel 246 is formed integrally with the drive member 248 of the detent mechanism 247. The ratchet wheel 246 and the drive member 248 have a hub 276 with a stepped bore 275 into which the hub section 268'' extends. A hub 276 rotatably receives and mounts the gear 243. The gear 243 has a hub 277 rotatably received in a bearing 278 formed integrally with the housing section 213. As seen in FIG. 39, the gears 242 and 243 are in driving engagement with respective gear sections 224 and 225 carried by the print head 219; the relative position of the drive pawl 245 to the ratchet wheel 246 is also shown.

With reference to FIG. 50, the drive member 248 includes a plurality of spring fingers or detent pawls 278. The pawls 278 are of equal length, are flexible and resilient, and are continuously urged against teeth 279 formed on the inside of the annular rim 267. In the illustrated embodiment there are one hundred and seventy-seven teeth 279 at equally spaced-apart intervals. There are twelve pawls 278 integrally connected to the hub 276 at equally spaced-apart intervals. The teeth 279 comprise respective tooth faces 280 and a recess between adjacent tooth faces 280 in which the end of a pawl 278 can be received. The pawls 278 drive the feed wheel 244 in a driving direction (counterclockwise in FIG. 50) but can move in a non-driving direction (clockwise in FIG. 50) relative to the feed wheel 244 by manually operating the detent mechanism 247. Accordingly, every fifth pawl 278 is engaged with the face 280 of a tooth 279. The pawls 278 between every fifth set of pawls are out of engagement with their respective tooth faces 280 by different increments as best illustrated in FIG. 51. Normally, the pawls 278 hold the ratchet wheel 246 and the feed wheel or driver 244 in fixed relationship with respect to each other. With reference to FIG. 50, as the drive pawl 245 moves counterclockwise the ratchet wheel 246 is driven counterclockwise and the three pawls 278 which are in driving engagement with their respective tooth faces 280 will drive the feed wheel 244 counterclockwise. Accordingly, there is [not] *no* relative rotation between the ratchet wheel 246 and the feed wheel 244. Should it be desired to change the position to which the labels are advanced by the feed wheel 244 upon actuation of the operator 235, the user will grasp the knobs 270 and 270' and will rotate the knob 270' counterclockwise (FIG. 37) relative to the knob 270. This will cause the input member 248 to rotate (counterclockwise in FIG. 37, clockwise in FIG. 50) relative to the feed wheel 244 so that the next three successive teeth move into engagement with the next three respective tooth faces 280. For example, if it is considered that first, fifth and ninth pawls 278 were initially in engagement with respective teeth 279, only a very slight rotation will cause second, sixth and tenth pawls to move into engagement with their respective tooth faces 280, and so on. Although any desired number of pawls 278 and teeth 280 can be used, the illustrated embodiment provides very minute adjustment of the fed wheel 244 relative to the platen 217 and the peel edge 218 and the arrangement of teeth 280 and cooperating pawls 278 causes the entire input or drive member 248 to be centered within the annular rim 267. With respect to the printing function, adjustment of the detent mechanism 247 changes the position relative to the printing zone between the print head 219 and the platen 217 to which a label [26] *36* is advanced. With respect to the delaminating function, operation of the detent mechanism 247 also changes the position to which the label 36 is advanced. Accordingly, it is apparent that the detent mechanism 247 is useful both in establishing the position to which a label is advanced relative to the printing zone and to the delaminating zone. It is important that just the correct amount of trailing marginal end edge of the label remain adhered to the peel edge so that the label 36 is held in that position until it is ready to be applied to merchandise by the applicator 253.

As best shown in FIGS. 50, 52, and 53, the supporting material 32 is initially brought into engagement with the feed wheel 244 as it passes around the die wheel 259. The die wheel 259 is comprised of an annular plastic roll 281 journaled by subframe sections 215 and 216. The roll 281 has frictional members in the form of rubber O-rings 282 received at spaced-apart locations about the periphery of the roll 281. The O-rings straddle the teeth 249 and are just spaced apart far enough to act as a die wheel with mating teeth 249. As a tooth 249 begins to engage the web of supporting material 32 at the cut 39S (FIG. 2), the die wheel 259 cooperates with the tooth 249 to hold the supporting material 32 on each side of the group 38 of cuts in intimate contact with the outer surface of the feed wheel 244 as best shown in FIG. 53. This insures that the tooth 249 properly bursts or forms a hole, facilitated by the group 38 of cuts, in the supporting material 32 and that the drive face of the tooth 249 is in driving engagement with the leading cut 41S. When the first tooth 249 registers with the group 38 of cuts in the supporting material 32 the composite web 30 is properly registered with the printing zone and the delaminating zone. Once such registration is accomplished as the result of the tooth 249 cooperating with the die roll 259, correct registration continues.

The platen 217 and the peel edge 218 (FIGS. 37 and 38) are formed from an inversely-bent plate having a pair of side-by-side plate portions 283 and 284 joined by an inversely-bent portion 285. The inversely-bent portion 285 has a small radius and defines the peel edge 218. The platen portions 283 and 284 are co-extensive and are secured to each other by weldments 286. The plate which forms the platen 217 and the peel edge 218, received in recesses 286' in subframe sections 215 and 216, is preferably constructed of highly polished stainless steel. The sides of the plate that forms the platen 217 and the peel edge 218 are received in opposed recesses 286' in the subframe sections 215 and 216. A label stopper is provided by a pair of aligned plates 218' formed integrally with the subframe sections 215 and 216. The plates 218' are disposed beneath but are spaced from the plate 217. Should a label 36 attempt to fall onto the supporting material 32 after being delaminated at the peel edge 218, the labels 36 will be caught by the plates 218'. This will prevent any label 36 from continuing along the path through which the supporting material 32 passes after passing the peel edge 218.

With reference to FIG. 38, the stop block 239 is shown to be slidable on a stop surface 287. The stop block 239 has a threaded bore 288 which threadably receives an adjusted screw 289. One half of the screw 289 is rotatably received in a semi-circular groove 290 and one-half of the head 291 of the screw 289 is captive in a semi-circular recess 292 in a seat 293. The handle portion 233 of the frame section 212 provides another stop surface (not shown) for the stop block 239 in alignment with the stop surface 287, another semi-circular groove (not shown) opposite the groove 290 for receiving the other one-half of the screw 289, and another semi-circular recess (not shown) opposite the recess 292 for receiving the other one-half of the head 291. A hole 294, one-half of which is formed by each handle portion 233 and 234, enables entry of a tool (not shown) by which the head 291 of the screw 289 can be engaged to rotate the screw 289. Rotation of the screw in one direction will cause the stop block 239 to move upwardly (FIG. 38) and rotation of the screw 289 in the opposite direction will cause the stop block 239 to move downwardly (FIG. 38). It is apparent that adjustment of the position of the stop block 239 will adjust the limit of the travel of the operator 235.

With reference to FIG. 48, the inking mechanism 252 is shown to comprise a one-piece inker body 295 having an aligned pair of sockets 296 having converging openings 297. The sockets 296 extend for more than 180° so that the ink roll 298 can be snapped into the sockets 296. The inker body 295 has a pair of aligned projections 299 which are capable of being snapped into sockets 300 (FIG. 37) in the cover 251. The sockets 300 are shaped like the sockets 296. The inker body 295 has an integrally formed leaf spring or spring finger 301 which is shown in FIG. 49 to be urged against the cover 251. The spring finger 301 normally urges the inking mechanism 252 into the solid line position shown in FIG. 49. The ink roller 298 is shown in FIG. 49 to be in the path of but slightly spaced from the print head 219 because in that position the inker body 295 contacts the frame 221 of the print head 219. When the print head 219 is moved from the solid line position to the phantom line position, the ink roll 298 applies ink to the printing bands 220 and the entire inking mechanism 252 pivots about projections 299 to the position shown in phantom lines. When the print head 219 returns to the solid line position shown in FIG. 49, the spring finger 301 returns the inking mechanism 252 to the solid line position.

With reference to FIG. 48, the ink roller 298 is shown to comprise a pair of hub section 302 and 303. The hub section 302 has an elongated projection 304 at one end and a stub end 305 at its opposite end. The hub section 302 has an annular flange 306 between the stub end 305 and a reduced portion 307. The reduced portion 307 is disposed between the flange 306 and the projection 304. The other hub portion 303 has an annular flange 308 disposed between a reduced portion 309 and a stub end 310. The reduced portion 309 has a bore 304' into which the projection 304 is adapted to be press-fitted. The projection 304 has straight flutes which serve to lock the hub portions 302 and 303 together. An ink-receptive tubular porous roll 311, composed for example of rubber or the like, is received on the reduced portions 307 and 309 of respective hub sections 302 and 303. The flanges 306 and 308 abut the ends of the roll 311 and prevent the roll 311 from shifting.

With reference to FIGS. 42, 43 and 44, the subframe sections 215 and 216 are shown to have respective integral leaf springs 312 and 313. The leaf springs 312 and 313 are provided with integral annular brake members 314 and 315 having respective annular brake surfaces 316 and 317. Brake members 314 and 315 are formed integrally with projections or hubs 318 and 319, surfaces 318' and 319' of which are received in and mount label core 44. The brake surfaces 316 and 317 cooperate to exert braking forces on the label core 44. Neither the hubs 318 and 319 nor the brake members 314 and 315 contact the composite web 30 which is wound on the label core 44. In this manner, any gum or adhesive that may [exit] *exist* at the marginal side edges of the composite web 30 will not be transferred to the brake surfaces 316 and 317. FIG. 45 illustrates, in exaggerated form, by phantom lines, the initial positions of the leaf springs 312 and 313, the brake members 314 and 315 and the hubs 318 and 319. The initial canted position of the leaf springs 313, the brake members 315 and the hub 319 relative to the remainder of the subframe section 216 is also shown in FIG. 43. Insertion of the label core 44 onto the hubs 318 and 319 will cause the leaf springs 312 and 313 to flex outwardly and the brake surfaces 316 and 317 will exert a predetermined braking force on the ends of the core 44. The braking force applied to the core 44 will insure that there is tension in the web 32 of supporting material from the label roll to the printing zone, to the peel edge 218, and to the toothed driver 244. As the pawl 266 (FIG. 50) prevents the reverse rotation of the driver 244, it is seen that the apparatus maintains a slight but desirable amount of tension on the web of supporting material 32 at all times.

The frame 211 comprises an essentially closed shell but the rear part provides an access opening 211' through which a roll of labels can be inserted and a spent core 44 can be removed without even partial disassembly of the apparatus 210.

With reference to FIGS. 55 through 58, there is shown the applicator 253 mounted by the frame 211. The applicator 253 comprises a hub 320 shown to have four annular generally V-shaped grooves 321 in which respective wheels 322 are rotatably mounted. The hub 320 also has a pair of annular flanges 323 disposed between the set of three wheels 322 and the remaining wheel 322. The wheels 322 have greater diameters than the flanges 323. The ends of the hub 320 beyond the grooves 321 are stub ends 324. Undercuts 325 inboard of the stub ends 324 enable the hub to be retained in cooperating yieldable sockets 326 and 327 in frame sections 212 and 213. The sockets 326 and 327 are comprised of a plurality of separate socket sections or flexible resilient fingers 328 and 329 to enable the stub ends 324 to be snapped into place. The sockets 326 and 327 and the cooperating stub ends 324 provide opposed snap-fit connections.

The wheels 322 are identical so only one is described in detail. Each wheel 322 is comprised of an annular rim 330 having an annular groove 331 in its outer periphery. A rubber O-ring 332 is received in the groove 331. A plurality of equally spaced-apart arms 333 formed integrally with the rim 330 have generally V-shaped bearing sections 334 received in the respective groove 321. The bearing sections 334 of the arms 333 exert forces against the hub 320, but enable the wheel 322 to rotate relative to the hub 320 and enable the [wheels] *wheel* 322 to yield as a label 36 is being applied to the merchandise.

As the rubber O-rings 332 have a high coefficient of friction, rotation of the wheels 322 during label application is facilitated. The spacing of the wheels 322 allows the applicator 253 to press the label 36 onto the [mechandise] *merchandise* without contacting the printing which was applied to the labels 36 by the print head 219. As the label is pressed onto the merchandise, the arms 333 allow the wheels to yield. This yielding action is particularly useful when applying labels to merchandise having irregular surfaces in that the wheels 322 are mounted for both independent rotational and independent yielding movements with respect to each other. The flanges 323 prevent the adjacent wheels 322 from deflecting more than a small amount away from the perpendicular with respect to the hub 320.

Referring to FIG. 59, there is shown an exploded view of the print head 219. The print head frame 221 is shown to comprise a side plate 335 to which the flanges 222 and 223 are joined. A mounting block 336 is molded integrally with the side plate 335. The block 336 has a platen or pressure member 337 and arcuate mounting surfaces 338. The mounting block 336 also has a socket 339 for receiving a projection 340 of the other side plate 341. A post 342 is formed integrally with the side plate 335 in axial alignment with a hole 343 in the side plate 341. A pair of posts 344 formed integrally with the side plate 335 have hooks 345 which engage shoulders 346 of the side plate 341. The side plate 341 has projections 347 which are adapted to fit under projections 348 on the block 336. When the projections 347 are positioned underneath the projections 348, that is, between the projections 348 and the side plate 335, the projection 340 is received in the socket 339, and when the hooks 345 are in engagement with shoulders 346, then the frame 221 is securely but releasably locked together.

The printing bands 220 are mounted in the frame 221 as best shown in FIG. 60. The printing bands 220 are urged against the support or pressure member 337 and are detented because teeth 349 formed on the underside of each of the printing bands 220 are in engagement with notches 350 formed on the side of the support 337. In this position, the projection 340 is shown received in the socket 339, the printing bands are trained partially around driven members in the form of wheels 351, the printing bands 220 are under slight tension, and the wheels are cradled in and rotatable on the mounting surfaces 338. The wheels 351 have notches 352 in which the teeth 349 are received.

Each printing band 220 has a plurality of printing blocks 353. The different printing blocks 353 of each printing band 220 can print different data, as in conventional. The printing blocks 353 are contained in a printing section 354 of the printing band 220. The printing band 220 also contains a non-printing human readable section 355. The human readable section 355 contains human readable indicia. The user knows what data the printing block 353 at the pressure member 337 will print by peering through a window 356.

It [if] *is* often desirable to change the data which the print head 219 is to print. This is generally accomplished by advancing the printing band 220 to the printing position in which the selected data will be printed on the label. A selector, generally indicated at 357, has a knob 358 and a shaft or tubular portion 359 received by the post 342. The selector 357 is freely rotated about the post 342 and is movable axially so that its driving members or lugs 360 can be shifted into driving cooperation with any one of the driven members 351. Each driven member 351 has a central hole 361 which is provided with a plurality of notches 362 for receiving respective lugs 360. Each driven member 351 is also chamfered at the central hole 361 as best indicated at 363. In addition to the driving lugs 360, the selector 357 is shown to have a pair of opposed pawls or spring detent fingers 364, the ends of which engage the recesses provided by the chamfering 363. The detent fingers [346] *364* serve to hold the selector 357 in the axial position to which it is manually shifted, but enable the selector 357 to be shifted to any desired position so that its driving members 360 will be in driving engagement with the selected driven member 351. Accordingly, by shifting the selector 357, any one or all of the driven members 351 can be rotated, one at a time, which results in the respective printing band or [hands] *bands* 220 being selectively moved to the selected position to print the selected data on the labels.

The driving lugs 360 are spaced slighted from the ends of the recesses or notches 362. Should the user attempt to turn the knob 358 so as to apply excessive torque to the selector 357, the driving lugs 360 will deflect and move out of the set of notches 362 in which they are positioned in the driven member 351 and will move into the next set of notches 362 in the same driven member 351. Accordingly, there will be relative rotation between the selector 357 and the driven member 351 in which the lugs 360 are received.

There is a spacer [356] *365* between each of the driven members 351 and bands 220. Each of the spacers 365 has a pair of lugs 365' which engage around the ends 366 at the ends of the mounting surface 338.

The selector 357 is provided with an annular groove 367 adjacent the knob 358. An indicator, generally indicated at 368, has a split collar 369 with a projection 370 received in the groove 367. The indicator 368 has a rectangular section 371 which defines the window 356. The posts 344 have tongues or guides 344' which are in engagement in grooves 372 in the rectangular section 371. A pair of pointers 373 disposed on the inner surface of the rectangular section 371 are in alignment with the lugs 360 on the selector 357. Accordingly, the pointers 373 indicate the position of the lugs 360 so that if the selector 357 is not in position to drive the desired driven member 351 and its associated printing band 220, the selector 357 can be shifted to a position in which the lugs 360 are in driving engagement with the desired driven member 351 to advance the associated printing band 220 to the selected position.

As shown in FIG. 59, the side plate 341 has a projection or lug 374 by which the printing head 219 is guided by the frame sections 212 and 213 by respective guides 375 and 376 (see FIGS. 37, 38, 49).

The housing or frame sections 212 and 213 are connected by identical snap-fit connections including generally snap-shaped flexible resilient members 377 arranged along the periphery of the housing section 212 and engaged in undercut recesses 378 in the housing section 213. One of these snap-fit connections is shown in detail in FIG. 40.

The subframe sections 215 and 216 of the subframe 214 are connected to each other and the frame sections 212 and 213 of the frame 211 are connected to the subframe 214 by means of three sets of identical snap-fit connections generally indicated at 379, one of which is shown in detail in FIG. 54. With reference to FIG. 54, the frame sections 212 and 213 have respective sockets 380 and 381 comprised of a plurality of respective flexible resilient fingers 382 and 383. The subframe section 215 has a projection 384 snap-fitted into the socket 380. The projection 384 has a plurality of flexible resilient spring fingers 385. The subframe section 216 has a projection 386 comprised of a plurality of flexible resilient fingers 387 snap-fitted into the socket 381. The subframe section 215 has a projection 388 comprised of a plurality of flexible resilient spring fingers 389 received in a socket 390. The socket 390 is comprised of flexible resilient spring fingers 391. A projection 392 formed integrally with the frame section 212 extends through the socket 380, through the projection 384, and to about the end of the projection 388 in the socket 390. The spring fingers 383 of the socket 381 are made thinner and consequently more flexible than the spring fingers 382 of the socket 380. An attempt to open up the frame 211 by separating the frame sections 212 and 213 will cause the frame section 213 to be separated from the sub-frame section 216. The frame section 212 will remain connected to the subframe 214. As the frame section 213 is being separated from the subframe 214, the projection 392 prevents the subframe sections 215 and 216 from separating because the spring fingers 389 cannot deflect inwardly because of the interference provided by the projection 392. Once the frame section 213 has been removed, the inside of the apparatus 210 is exposed. It is apparent that accidental unsnapping of the subframe 214 or the frame section 212 from the subframe 214 is obviated by this construction. Further disassembly can be accomplished by deliberately unsnapping the subframe 214 from the frame section 212. This is accomplished by moving the projection 384 out of the socket 380. When this has been accomplished, the projection 392 has moved out of the space between the spring fingers 389 of the projection 388 and consequently the subframe sections 215 and 216 can be separated.

With reference to FIGS. 42 through 44 for example, the subframe section 216 is shown to have four projections 393 which are adapted to be snugly received in recesses 394 at the end of the guide 262. The projections 393 received in the holes 394 assist in removably holding the subframe sections 215 and 216 together.

With reference to FIGS. 37 and 49 the cover 251 is shown to have an L-shaped flange 395 at one end and a projection 396 at its other end. To attach the inking mechanism 252 to the apparatus, the projection 395 is pushed under a shoulder 397 of the frame section 213 and thereafter the cover 251 is snapped into position by causing the projection 396 to snap under a lip 398 of the frame section 213. In this manner, the inking mechanism or inker 252 is removably mounted to the apparatus. To remove the inking mechanism, the user can engage his fingernail beneath an extension 399 of the cover 251, thereby causing the projection 396 to snap around the lip 398.

With reference to FIG. 41, the operator 235 is shown to pivot on the pin 237. It is preferred to pivot the operator 235 at the lower end of the handle 232 in that the user's strongest fingers, namely his index, middle and ring fingers engage the operator 235 at substantial distances from the pivot pin 237, while the user's relatively weak little finger is close to the pivot pin 237. The ends of the pin 237 are undercut as indicated respectively at 403 and 404. The ends 401 and 402 are received in sockets 405 and 406 in respective frame sections 212 and 213. The sockets 405 and 406 are comprised of respective flexible resilient fingers 407 and 408. The operator 235, as best shown in FIGS. 38 and 39, is shown to be generally U-shaped in section. Legs 409 and 410 are shown to be rotatably received about the pin 237. The spiral or torsion spring 238 is shown to be received on pin 237 between the legs 409 and 410. If it is desired to remove the frame section 213, the frame section 213 is moved relatively away from the frame section 212 causing the socket 406 to move out of snap-fit engagement with the end 402. Only when the operator 235 is moved away from the frame section 212 can the end 401 move out of the socket 405 because of interference caused by leg 409. This construction obviates accidental disconnection of the pin 237 from the frame sections 212.

With reference to FIG. 63, there is shown an alternative construction by which a selector 357a having a plurality of driving lugs 360a like the lugs 360 and also having a pair of opposed pawls 364a, selectively controls the setting of a selected driven member or wheel 351a. The embodiment of FIG. 63 differs from the embodiment of the print head 219 shown for example in FIGS. 59 through 62 in that each of the driven members 351a is provided with an internal annular groove 411 and the chamfering 363 (FIG. 62) is omitted. Accordingly, instead of having the pawl 364a engage between adjacent driven members 351 as shown in FIGS. 61 and 62 for example, the pawls 364a engage in the groove 411 of one of the driven members 351a, and as is preferred in the groove 411 of the same wheel with which the lugs 360a are in driving engagement. By this construction, the driving function as well as the detenting function are accomplished by the selector 357a in cooperation with a single driven member 351a.

FIG. 62 is actually an alternative embodiment which shows the detenting of one of the pawls 364 in recesses or grooves provided by beveling or chamfering 363. FIG. 62 shows one of the wheels 351 as wider than the adjacent wheel 351 to show that the selector 357 in accordance with the invention can work equally well with wheels 351 of different sizes without affecting detenting. With such a construction some of the printing bands 220 can be wider than others as is highly desirable in some applications.

With reference to FIGS. 64 and 65, there is shown another embodiment of a selector generally indicated at 357b. The selector 357b is the same as the selector 357 in that it has four drive lugs 360b, and a pair of opposed pawls 364b. The selector 357b differs from the selector 357 only in that the selector 357 is of one-piece construction and the selector 357b is of two-piece construction. The selector 357b comprises body sections 412 and 413 snap-fitted together. The body section 412 has a non-circular hole, and in particular a square hole 414, and the body section 413 has a corresponding square portion 415 received in the hole 414. By this construction, the body sections 412 and 413 are incapable of rotating relative to each other. The body section 413 has four flexible resilient fingers 416 terminating at projections 417 shown in FIG. 64 to be received over a bead 418. In this position, an annular flange 419 is in abutment with a shoulder 420 on the body section 412. The selector 357b is used in the same manner as the selector 357. If desired, the selector 357a (FIG. 63) can be made in two parts as illustrated in FIGS. 64 and 65.

Referring to the embodiment of FIG. 66, there is shown a print head generally indicated at 219c having two spaced-apart sets of printing members [220a] *220c*. The print head 219c has two sets of mounting blocks 366c, two sets of driven members 351c and posts 344c, all formed integrally with side plate 335c. Flanges 222c and 223c and gear sections 224c and 225c are spaced apart wider than the flanges 222 and 223 and gear sections 224 and 225. Accordingly, the pair of gears (not shown) which would mesh with gear sections 224c and 225c would have to be spaced apart by a greater distance than the gears 242 and 243. It is also apparent that ball tracks (not shown) which would correspond to the ball tracks 230 and 231 would have to be spaced wider apart, as would be readily apparent to one skilled in the art. Side plate 341c carries a guide member 374c. The side plate 341c rotatably mounts a pair of selectors 357c for the respective set of driven members 351c. The posts 344c mount respective rectangular sections 371c which provide respective windows 356c. It is readily apparent that with slight modifications the print head 219c can be operated by a mechanism the same in principle and construction as the mechanism which operates the print head 219.

Referring to the embodiment of FIGS. 67, 68 and 69, there is provided a selector 357d which is identical to the selector 357. Printing members take the form of print wheels 220d. Each print wheel 220d is shown to be identical and comprises printing elements 421 carried by an annular hub 422. A mounting and detenting wheel 423 is shown to be formed integrally with each side of the hub 422. The wheels 423 have generally annular outer surfaces 424 received in sockets 425 of adjacent mounting members 426. The sockets 425 comprise an annular portion 427 and a pair of flexible resilient arms 428 formed integrally therewith. Accordingly, the print wheels 220d can be inserted either axially into the sockets 425 or they can be inserted into or removed from the respective sockets 425 by spreading arms 428. Mounting members 426 are provided with recesses 429 in which offset integrally formed detent pawls or spring fingers 430 and 431 are disposed. The pawl 430 of one mounting member 426 is cooperable with notches 430' to effect detenting of an adjacent print wheel 220d on one side of the mounting member 426, and the other is cooperable with notches 431' to effect detenting of the adjacent print wheel 220d on the other side of the mounting member 426.

Each wheel 220d has a central hole 432, the ends of which are chamfered as indicated at 433. As best shown in FIG. 69, pawls 364d are received in the chamfering between adjacent wheels 220d and drive lugs 360d are in driving engagement with the adjacent print wheel 220d. If desired, detenting can be effected in the manner illustrated in the embodiment of FIG. 63.

It is preferred to mold the driver or feed wheel 244 of a material which incorporates a lubricant to diminish the amount of gum or adhesive that is transferred to the feed wheel 244 during use to prevent improper feeding. By incorporating the lubricant in the feed wheel 244 the surface of the feed wheel 244 has a low coefficient of friction. However, the teeth 249 are adequate to grip and drive the web 32. One specific material to be used to mold the feed wheel is an acetal resin combined with polytetrafluoroethylene lubricants. One such material is sold commercially under the name Thermocomp, Number KL-4030 by Liquid Nitrogen Processing Corporation, Malvern, Pennsylvania, U.S.A. The remainder of the apparatus in FIGS. 37 through 69 except for the platen 217, O-rings 282 and 332, the ball bearings 228 and 229, the spring 238, the washers 365, and rubber printing bands 220, are composed of suitable lightweight moldable plastic materials, for example, acetal, acrylonitrile-butadiene-styrene, or the like, but the ink roll 311 is preferably constructed of porous vinyl. Accordingly, the apparatus is very light in weight, and easy and convenient to use with a minimum of fatigue.

Other embodiments and modifications of this invention will suggest themselves to those skilled in the art, and all such of these as come within the spirit of this invention are included within its scope as best defined by the appended claims.

Figure 70:
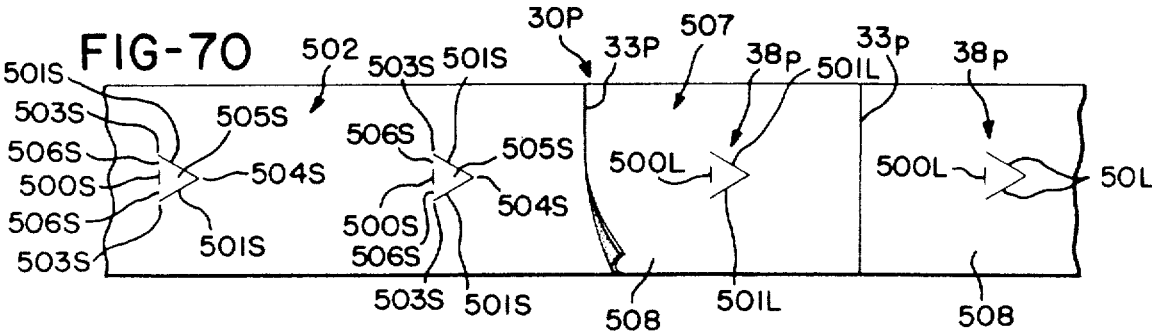
FIG. 70 is a top plan view of a composite label web in accordance with another embodiment of the invention.

In the embodiment of FIG. 70, there is shown a composite label web 30P having groups 38p of cuts at regularly spaced apart intervals. Each group 38p of cuts has a short generally transverse through cut 500S and a pair of converging through cuts 501S in the web of supporting material 502. The cuts 501S are preferably equal in length. The leading ends 503S of the cuts 501S are shown to be in transverse alignment with the transverse cut 500S. Trailing ends of the cuts 501S are joined at a point or vertex 504S. The cut 500S and leading ends 503S of cuts 501S are disposed along a fold line for the respective flap or flap portion 505S. The cut 505S is shorter than the width of a tooth of the toothed driver, such as the toothed driver 47e. There are lands 506S at opposite ends of the cut 500S inboard of leading ends 503S. Cuts 500L and 501L are provided through the web of label material 507 in alignment with respective cuts 500S and 501S in the supporting material 502. The cuts 501L are preferably equal in length. The cuts 500L and 501L in the label material web 507 serve to prevent switching of labels 508 when applied to merchandise. In the embodiment of FIG. 70, it is preferred that each group 38p of cuts be disposed between end edges of the labels 508 defined by transverse butt cuts 33p. As in the embodiment of FIGS. 28 and 29, a tooth 166 of a toothed driver 47e will engage the supporting material web 502 at the flaps or flap portions 505S and deflect the flap portions 505S out of the plane of the web 502. The tooth 166 will engage a respective flap portion 505S at its triangular face and at the fold line between the cut 500S and the leading ends 503S. The tooth 166 also engages the feed edge provided by the cut 500S. As in the embodiment of FIGS. 28 and 29, the composite web 30P is wound into the form of a roll in a direction that the leading ends 503S of cuts 501S and the respective cut 500S of a group 38p are at a leading position and respective flap portion 505S extends away from the leading free end of the roll and toward the trailing end of the roll which typically is adjacent the label core. As the web 30P is paid out of the roll, the flap portions 505S trail across the delaminator such as 218. As shown in FIGS. 1 and 38 for example, the web 502 would be engaged by the toothed driver, such as the driver 47e downstream of the delaminator. An advantage of feeding the web 30P in this direction is that the flap portions 505S will not deflect out of the plane of the web until the teeth 166 fold the flap portions 505S out of the plane of the web 502. This advantage of having a trailing flap portion is also inherent in the embodiment of FIGS. 28 and 29. Having flap portions which extend in the leading direction as in the prior art is conductive to the flap portion deflecting out of the plane of the web at the delaminator which results in tearing of the supporting material web. The composite web 30P preferably is made with the cuts 500S and 501S and aligned cuts 500L and 501L extending completely through the supporting material web 502 and the label material web 507. This is the same as with the composite webs shown in FIGS. 1 through 33. By this preferred arrangement there is inherently the advantage that the composite web of any of these embodiments including the embodiments of FIGS. 70, 71 and 72, the composite web can be threaded through the apparatus 210 without removing labels from the supporting material web. The tooth of the toothed driver can poke through both the supporting material and the label material web because of the localized weakening provided by the series of flap forming cuts. This poking through of the teeth of the toothed driver can also be achieved when the cuts are only partially through the label material as in the embodiment of FIGS. 34 through 36 but with added resistance from the label material.

Figure 71:
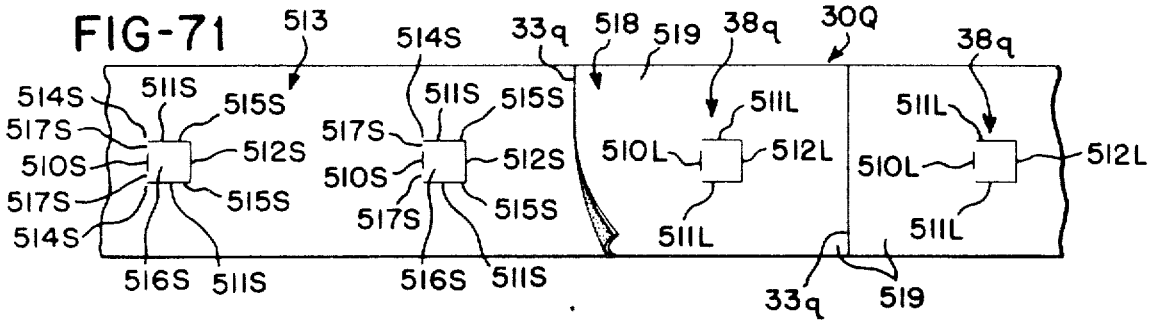
FIG. 71 is a top plan view of a composite label web in accordance with yet another embodiment of the invention.
Figure 72:
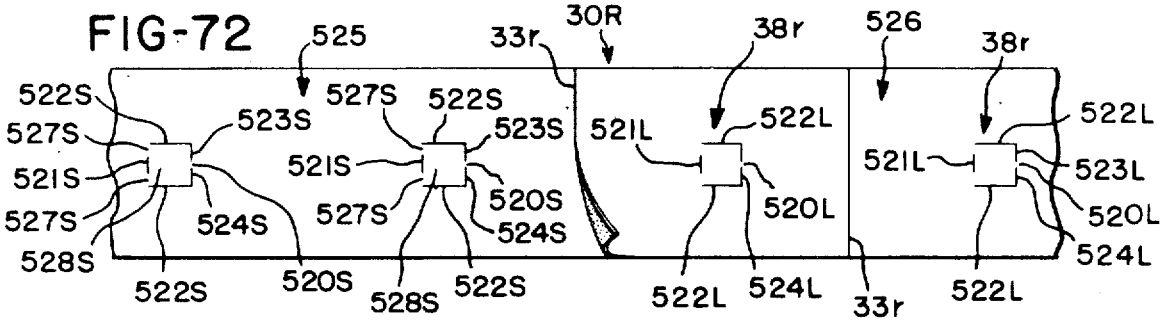
FIG. 72 is a top plan view of a composite label web in accordance with yet another embodiment of the invention. [de]

The embodiments of FIGS. 71 and 72 offer the advantage of a trailing flap portion as in the embodiments of FIGS. 28 and 29 and of FIG. 70 but the embodiment of FIG. 72 has the advantage that the composite web has greater integrity or strength because of the frangible portions.

In the embodiment of FIG. 71, there is shown a composite web 30Q having groups 38q of cuts at regularly spaced apart intervals. Each group 38q of cuts has a short generally transverse cut 510S, a pair of longitudinal cuts 511S and a transverse cut 512S in the web of supporting material 513. The leading ends 514S of the cuts 511S are shown to be in transverse alignment with the transverse cut 510S. Trailing ends 515S of the cuts 511S are joined in opposite ends of the cut 512S. The cut 510S and the respective leading ends 514S of respective cuts 511S are disposed along a fold line for the flap or flap portion 516S. The cut 510S is shorter than the cut 512S. There is supporting material on both sides of each cut 510S inboard of the leading ends 514S of the cuts 511S to provide lands 517S. The lands 517S are shown to be equal in width and the cuts 511S are shown to be of equal length. Cuts 510L, 511L and 512L are provided through the web of label material 518 in alignment with respective cuts 510S, 511S and 512S in the supporting material web 513. The cuts 510L, 511L and 512L in the label material web 518 serve to prevent switching of labels 519 when applied to merchandise. In the embodiment of FIG. 71, it is preferred that each group 38q of cuts be disposed between end edges of the labels 519 defined by transverse butt cuts 33q. As in the embodiment of FIGS. 28 and 29, and FIG. 70, a tooth 166 of a toothed driver 47e will engage the supporting material web 513 at the flaps or flap portions 516S and deflect the flap portions 516S out of the plane of the web 513. The tooth 166 will engage a respective flap portion 516S at its rectangular face and at the fold line between the cut 510S and the leading ends 514S of the cuts 511S. The tooth 166 also engages the feed edge provided by the cut 510S. As in the embodiment of FIGS. 28 and 29, the composite web 30Q is wound into the form of a roll in a direction that the leading ends 514S of cuts 511S and the respective cut 510S of a group 38q are at a leading position in the web and the respective flap portion 516S extends away from the leading free end of the roll and toward the trailing end of the roll which typically is adjacent the label core. As the web 30P is paid out of the roll, the flap portions 516S trail across the delaminator 218. The web 513 would be engaged by the toothed driver such as the driver 47e downstream of the delaminator.

The embodiment of FIG. 72 is identical in construction and use to the embodiment of FIG. 71 except that composite web 30R has groups [38] *38r* of cuts with frangible portions 520S and 520L. The web 30R has through cuts 521S, 522S, 523S and 524S in the supporting material 525 and aligned through cuts 521L, 522L[.], 523L and 524L in the label material 526. The cuts 521L, 522L, 523L and 524L can be made only partially through the label material web 526 if desired as in the embodiment of FIGS. 34 through 36. The land 520S is much shorter than respective lands 527S so that the land 520S will always be severed by the tooth 166 and so that the lands 527S will not be severed. The web 30R is wound the same way as the webs of the embodiments of FIGS. 28 and 29, 70 and 71 so that flaps or flap portions 528S trail across the delaminator 218 and so that both the feed edge formed by the cut 521S and by the respective fold line are engaged by the tooth 166. If desired, butt cuts 33r can be made between groups 38r as shown. Because of the frangible portions 520L the butt cuts 33r can be made transversely across the label material web 526 through cuts 522L between cuts 521L and cuts 523L and 524L.

Other embodiments and modifications of this invention will suggest themselves to those skilled in the art, and all such of these as come within the spirit of this invention are included within its scope as best defined by the appended claims.

I claim:

1. Method of making a composite web for use in a label dispensing apparatus, comprising the steps of: providing a composite web comprising a web of supporting material and labels releasably secured to the supporting material web longitudinally along the supporting material web, cutting the supporting material web at longitudinally spaced-apart locations to form flap portions extending initially in the plane of the supporting material web but which are capable of being folded out of the plane of supporting material web about respective fold lines, and cutting the supporting material web at the fold lines without completely separating the flap portions from the supporting material web to provide respective feed edges so that the supporting material web can be advanced by a toothed driver engaging the supporting material web at the feed edges, the composite web being wound into a roll in a direction that each feed edge is in a leading position with respect to the outer free end of the composite web and the respective flap portion is in a trailing position.

2. Method of making a composite web for use in a label dispensing apparatus, comprising the steps of: providing a composite web comprising a web of supporting material and labels releasably secured to the supporting material web longitudinally along the supporting material web, making groups of converging cuts in the supporting material web at longitudinally spaced-apart locations to form flap portions extending initially in the plane of the supporting material web but which are capable of being folded out of the plane of the supporting material web about respective fold lines, and making cuts at the fold lines without completely severing the flap portions from the supporting material web for providing respective feed edges so that the supporting material web can be advanced by a toothed driver engaging the supporting material web at the feed edges, the composite web being wound into a roll in a direction that each feed edge is in a leading position with respect to the other free end of the composite web and the respective converging cuts are in a trailing position.

3. Method as defined in claim 2, wherein the cuts at the fold lines are made transversely of the supporting material web.

4. Method as defined in claim 2, wherein the cuts at the fold lines are made transversely of the supporting material web, and the converging cuts of each group are made to terminate at their more widely spaced-apart ends at the respective fold line which is in alignment with the respective transverse cuts.

5. Method as defined in claim 2, wherein the converging cuts are made to join each other.

6. Method of making a composite web for use in a label dispensing apparatus, comprising the steps of: providing a composite web comprising a web of supporting material and labels releasably secured to the supporting material web longitudinally along the supporting material web by pressure sensitive adhesive, making first cuts in the supporting material web at longitudinally spaced-apart locations forming flap portions extending initially in the plane of the supporting material web but which are capable of being folded out of the plane of the supporting material web about respective fold lines, the first cuts at each location being spaced apart to provide a respective frangible portion, and making second cuts at the fold lines without completely severing the flap [portion] *portions* from the supporting material web for providing respective feed edges so that the supporting material web can be advanced by a toothed driver engaging the supporting material web at the feed edges, the composite web being wound into a roll in a direction that each feed edge is in a leading position with respect to the outer free end of the composite web and the respective first cuts are in a trailing position.

7. Method of making a composite web for use in a label dispensing apparatus, comprising the steps of: providing a composite web comprising a web of supporting material and a web of label material releasably secured to the supporting material web by pressure sensitive adhesive, cutting the label material web transversely across the label material web at longitudinally spaced-apart locations to provide a plurality of labels, and making groups of cuts in the supporting material web at longitudinally spaced-apart locations between side edges of the supporting material web *to provide flap portions*, the making of each group of cuts including making a first cut defining a feed edge and making a second longitudinally extending cut extending toward the first cut between the ends of the first cut, the composite web being wound into a roll in a direction *such* that each feed edge is in a leading position with respect to the outer free end of the composite web and the respective second cut is in a trailing position *and such that none of the flap portions extend in a leading direction toward the outer free end of the composite web.*

8. Method as defined in claim 7, wherein the first cuts are made transversely.

9. Method of making a composite web for use in a label dispensing apparatus, comprising the steps of: providing a composite web comprising a web of supporting material and a web of label material releasably secured to the supporting material web by pressure-sensitive adhesive, making groups of cuts in the supporting material web at longitudinally spaced-apart locations between side edges of the supporting material web *to provide flap portions*, the making of each group of cuts including making a first cut defining a feed edge and making a second longitudinally extending cut adjacent the first cut, and butt-cutting across the label material web at longitudinally spaced-apart locations at positions between opposite ends of at least some of the respective longitudinally extending cuts to provide a plurality of labels, the composite web being wound into a roll in a direction *such* that each feed edge is in a leading position with respect to the outer free end of the composite web and the respective second cut is in a trailing position *and such that none of the flap portions extend in a leading direction toward the outer free end of the composite web.*

10. Method as defined in claim 9, wherein the first cuts are made transversely.

[11. Method as defined in claim 9, wherein the first and second cuts are spaced apart by a frangible portion.]

12. Method as defined in claim 9, wherein the first and second cuts are joined.

13. Method of making a composite web for use in a label dispensing apparatus, comprising the step of: providing a composite web comprising a web of supporting material and a web of label material releasably secured to the supporting material web by pressure-sensitive adhesive, cutting across the label material web at longitudinally spaced-apart locations to provide a plurality of labels, and making groups of cuts in the supporting material web at longitudinally spaced-apart locations between side edges of the supporting material web *to provide flap portions*, the making of each group of cuts including making a first cut defining a feed edge and making a second cut extending toward the first cut between the ends of the first cut, the composite web being wound in a roll in a direction *such* that each feed edge is in a leading position with respect to the outer free end of the composite web and the respective second cut is in a trailing position *and such that none of the flap portions extend in a leading direction toward the outer free end of the composite web.*

14. Method of making a composite web for use in a label dispensing apparatus, comprising the steps of: providing a composite web comprising a web of supporting material and a web of label material releasably secured to the supporting material web by pressure-sensitive adhesive, making a series of butt cuts in the label material web at longitudinally spaced-apart locations to provide a series of pressure-sensitive labels on the supporting material web, and making a series of flap-forming cuts through the supporting material web and at least partially through the label material web between the marginal side edges of the composite web at longitudinally spaced-apart locations to provide *a series of* flap portions in the supporting material web, *all of the flap portions within the supporting material web projecting in the same direction,* the [supporting material] *composite* web being wound into a roll in a direction that *all of* the flap portions extend *only* in a trailing direction away from the outer free end of the [supporting material] *composite* web.

15. Method of making a composite web roll for use in a label dispensing apparatus, comprising the steps of: providing a composite web comprising a web of supporting material and a web of label material releasably secured to the supporting material web by pressure-sensitive adhesive, making a series of butt cuts in the label material web at longitudinally spaced-apart locations to provide a series of pressure-sensitive labels on the supporting material web, making a series of flap-forming cuts through the supporting material web between the marginal side edges of the supporting material web at longitudinally spaced-apart locations to provide *a series of* flap portions in the supporting material web, *all of the flap portions within the supporting material web projecting in the same direction,* the *composite* web being wound into a roll in a direction that *all of* the flap portions extend *only* in a trailing direction away from the outer free end of the *composite* web.

[16. Method of making a composite web for use in a label dispensing apparatus, comprising the steps of: providing a composite web comprising a web of supporting material and a web of label material releasably secured to the supporting material web by pressure-sensitive adhesive, making a series of butt cuts in the label material at longitudinally spaced-apart locations to provide a series of pressure-sensitive labels releasably secured to the supporting material web, and making a series of longitudinally spaced-apart bar cuts through the supporting material web to provide flap portions and at least partially through the label material to provide a weakened zone in the composite web adjacent each butt cut, the bar cuts being made adjacent the butt cuts and between the marginal side edges of the composite web.]

[17. Method as defined in claim 16, wherein each butt cut is made to cross the bar cut in the label material.]

[18. Method of making a composite label web for use in a label dispensing apparatus, comprising the steps of: providing a composite web comprising a web of supporting material and a web of label material releasably secured to the supporting material web by pressure sensitive adhesive, making laterally extending butt cuts in the label material web at longitudinally spaced apart locations to provide a plurality of labels, making a series of generally longitudinally extending linear knife cuts in the supporting material web at longitudinally spaced locations, and the generally longitudinally extending linear knife cuts enabling ready entry of outwardly projecting teeth of a toothed driver during use in a dispensing apparatus.]

[19. Method of making a composite label web as defined in claim 18, wherein the generally longitudinally extending linear knife cuts are formed to extend at least partially through the label material web.]

[20. Method of making a composite label web for use in a label dispensing apparatus, comprising the steps of: providing a composite web having a web of supporting material and a web of label material releasably secured to the supporting material web by pressure sensitive adhesive, making a series of generally longitudinally extending linear knife cuts in the supporting material web at longitudinally spaced apart locations, the generally longitudinally extending linear knife cuts enabling ready entry of outwardly projecting teeth of a toothed driver during use in a dispensing apparatus, and making a series of laterally extending butt cuts in the label material web at longitudinally spaced intervals to provide a plurality of labels with the butt cuts crossing the generally longitudinally extending linear knife cuts.]

[21. Method of making a composite label web as defined in claim 20, wherein the generally longitudinally extending linear knife cuts within the supporting material web are made to extend at least partially through the label material web.]

22. Method of making a composite web for use in a label dispensing apparatus, comprising the steps of: providing a composite web including a web of supporting material and a web of label material releasably secured to the supporting material web by pressure-sensitive adhesive, cutting across the label material web at longitudinally spaced-apart locations to provide a plurality of labels, and making groups of cuts in the supporting material web at longitudinally spaced-apart locations between side edges of the supporting material web, wherein the step of making groups of cuts includes making the cuts of each group in spaced apart relationship to form a frangible portion between two of the cuts.

23. Method as defined in claim 22, wherein the step of making groups of cuts further includes at least partially severing the label material with cuts in alignment with the cuts in the supporting material web.

24. Method of making a composite web for use in a label dispensing apparatus, comprising the steps of: providing a composite web including a web of supporting material and a web of label material releasably secured to the supporting material web by pressure-sensitive adhesive, cutting across the label material web at longitudinally spaced-apart locations to provide a plurality of labels, and making groups of converging cuts in the supporting material web at longitudinally spaced-apart locations between side edges of the supporting material web to provide flap portions, wherein the step of making groups of cuts includes making the converging cuts in an arrangement in which the one ends of the converging cuts of each group are relatively closely spaced to provide a frangible portion and the other ends of the converging cuts of each group are spaced more widely to provide a hinge for the flap portion when the frangible portion is ruptured.

25. Method of making a composite web for use in a label dispensing apparatus, comprising the steps of: providing a composite web including a web of supporting material and a web of label material releasably secured to the supporting material web by pressure-sensitive adhesive, cutting across the label material web at longitudinally spaced-apart locations to provide a plurality of labels, and making groups of curvilinear cuts in the supporting material web at longitudinally spaced-apart locations between side edges of the supporting material web to provide flap portions, wherein the step of making groups of cuts includes making laterally spaced apart curvilinear cuts in an arrangement in which the one ends of the curvilinear cuts of each group are relatively closely spaced to provide a frangible portion and the other ends of the converging cuts of each group are spaced more widely to provide a hinge for the flap portion when the frangible portion is ruptured.

26. Method of making a composite web for use in a label dispensing apparatus, comprising the steps of: providing a composite web including a web of supporting material and a web of label material releasably secured to the supporting material web by pressure-sensitive adhesive, cutting across the label material web at longitudinally spaced-apart locations to provide a plurality of labels, and making groups of cuts in the supporting material web at longitudinally spaced-apart locations between side edges of the supporting material web, the making of groups of cuts including making laterally spaced-apart cuts in each group forming a flap portion therebetween and connected to the supporting material web by a hinge portion and by a frangible portion, the composite web being wound into a roll in a direction that the flap portion [of each cut means] extends in a leading direction toward the outer free end of the web.

27. Method as defined in claim 26, wherein the step of making groups of cuts further includes at least partially severing the label material with cuts in alignment with the cuts in the supporting material web.

28. Method of making a composite web for use in a label dispensing apparatus, comprising the steps of: providing a composite web comprising a web of supporting material and a web of label material releasably secured to the supporting material by pressure-sensitive adhesive, cutting across the label material web at longitudinally spaced-apart locations to provide a plurality of labels, and making groups of converging cuts in the supporting material web at longitudinally spaced-apart locations between side edges of the supporting material web, the making of groups of converging cuts including making laterally spaced-apart cuts in each group forming a flap portion therebetween and connected to the supporting material web by a frangible portion, the composite web being wound into a roll in a direction that the flap portion of each cut means extends in a leading direction toward the outer free end of the web.

29. Method of making a composite web for use in a label dispensing apparatus, comprising the steps of: providing a composite web comprising a web of supporting material and a web of label material releasably secured to the supporting material by pressure-sensitive adhesive, cutting across the label material web at longitudinally spaced-apart locations to provide a plurality of labels, and making groups of curvilinear cuts in the supporting material web at longitudinally spaced-apart locations between side edges of the supporting material web, the making of groups of curvilinear cuts including making laterally spaced-apart cuts in each group forming a flap portion therebetween and connected to the supporting material web by a hinge portion and by a frangible portion, the composite web being wound into a roll in a direction that the flap portion of each cut means extends in a leading direction toward the outer free end of the web.

30. Method of making a composite web roll for use in a label dispensing apparatus having a toothed driver and a label separating peel edge, comprising the steps of: providing a composite label web having an elongated carrier web of flexible supporting material with a series of longitudinally disposed labels on the carrier web and with pressure sensitive adhesive on the labels and releasably securing each label to the carrier web, and making a series of longitudinally spaced groups of cuts in the carrier web and located under the labels with each group of cuts including spaced converging bar cuts defining in the carrier web a flap portion attached to an overlying label by the pressure sensitive adhesive with each flap portion being integrally connected to the carrier web by a narrow frangible portion defined between closely spaced portions of the converging bar cuts, each frangible portion being sufficiently strong to maintain the flap portion in the plane of the carrier web when the carrier web is pulled around the peel edge by the toothed driver and to effect peeling the corresponding flap portion from the pressure sensitive adhesive on the overlying label, and each frangible portion being sufficiently weak to rupture in response to engagement of the corresponding flap portion by the toothed driver.

*31. Method of making a composite web for use in a label dispensing apparatus, comprising the steps of: providing a composite web comprising a web of supporting material and a web of label material releasably secured to the supporting material web by pressure-sensitive adhesive, making groups of cuts in the supporting material web at longitudinally spaced-apart locations between side edges of the supporting material web, the making of each group of cuts including making a first cut defining a feed edge and making a second longitudinally extending cut adjacent the first cut, wherein the first and second cuts are spaced apart by a frangible portion, and butt-cutting across the label material web at longitudinally spaced-apart locations at positions between opposite ends of at least some of the respective longitudinally extending cuts to provide a plurality of labels, the composite web being wound into a roll in a direction that each feed edge is in a leading position with respect to the outer free end of the composite web and the respective second cut is in a trailing position.*

* * * * *

UNITED STATES PATENT AND TRADEMARK OFFICE

CERTIFICATE OF CORRECTION

PATENT NO. : Re. 32,490

DATED : September 1, 1987

INVENTOR(S) : William A. Jenkins

It is certified that error appears in the above-identified patent and that said Letters Patent are hereby corrected as shown below:

Column 12, line 48, "tracks" has been misspelled. Column 16, line 19, "platen" should be --plate--. Column 19, line 30, "rotated" should be --rotatable--. Column 24, line 25, "conductive" should be --conducive--; line 61, "in" should be --to--. Column 27, line 36, "feed" should be --free--; line 50, "step" should be --steps--.

Signed and Sealed this

Twentieth Day of September, 1988

*Attest:*

DONALD J. QUIGG

*Attesting Officer*

*Commissioner of Patents and Trademarks*